US006738619B1

United States Patent
Yabuta et al.

(10) Patent No.: US 6,738,619 B1
(45) Date of Patent: May 18, 2004

(54) BASE TRANSCEIVER STATION EQUIPMENT AND RADIO SUBSYSTEM

(75) Inventors: Hidehito Yabuta, Nagoya (JP); Tatsuya Wakuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/411,916

(22) Filed: Oct. 4, 1999

(30) Foreign Application Priority Data

Oct. 6, 1998 (JP) ............................................. 10-283967

(51) Int. Cl.⁷ ................................................. H04Q 7/00
(52) U.S. Cl. ........................ 455/423; 455/424; 455/436; 370/331
(58) Field of Search .................................. 455/423, 442, 455/436–439, 443–444, 424–425, 67.14, 450; 370/331, 337, 332–333, 335, 465, 468

(56) References Cited

U.S. PATENT DOCUMENTS 5,327,576 A   7/1994   Uddenfeldt et al.

FOREIGN PATENT DOCUMENTS

JP    4-140936    5/1992

Primary Examiner—Pablo N. Tran
(74) Attorney, Agent, or Firm—Katten Muchin Zavis Rosenman

(57) ABSTRACT

A base transceiver station equipment, and a radio subsystem using the same, provided a radio interface unit for forming a radio zone, receiving signals transmitted by a mobile station located in that radio zone based on a channel setting procedure or transmitted in a speech state, and measuring the quality of transmission; an identification information acquisition unit for acquiring identification information added to these received signals by a mobile station or identification information indicating a timing when those signals were received; a control unit for interfacing with the radio interface unit and a communication link formed with base station control equipment which takes the lead in the channel setting; and the control unit transmits transmission information given as a signal with a measured quality of transmission exceeding a threshold value among signals received by the radio interface unit and the identification information obtained by the identification information acquisition unit for this signal to the communication link. Thereby, the amount of traffic between a base transceiver station and a base station control office can be reduced.

3 Claims, 21 Drawing Sheets

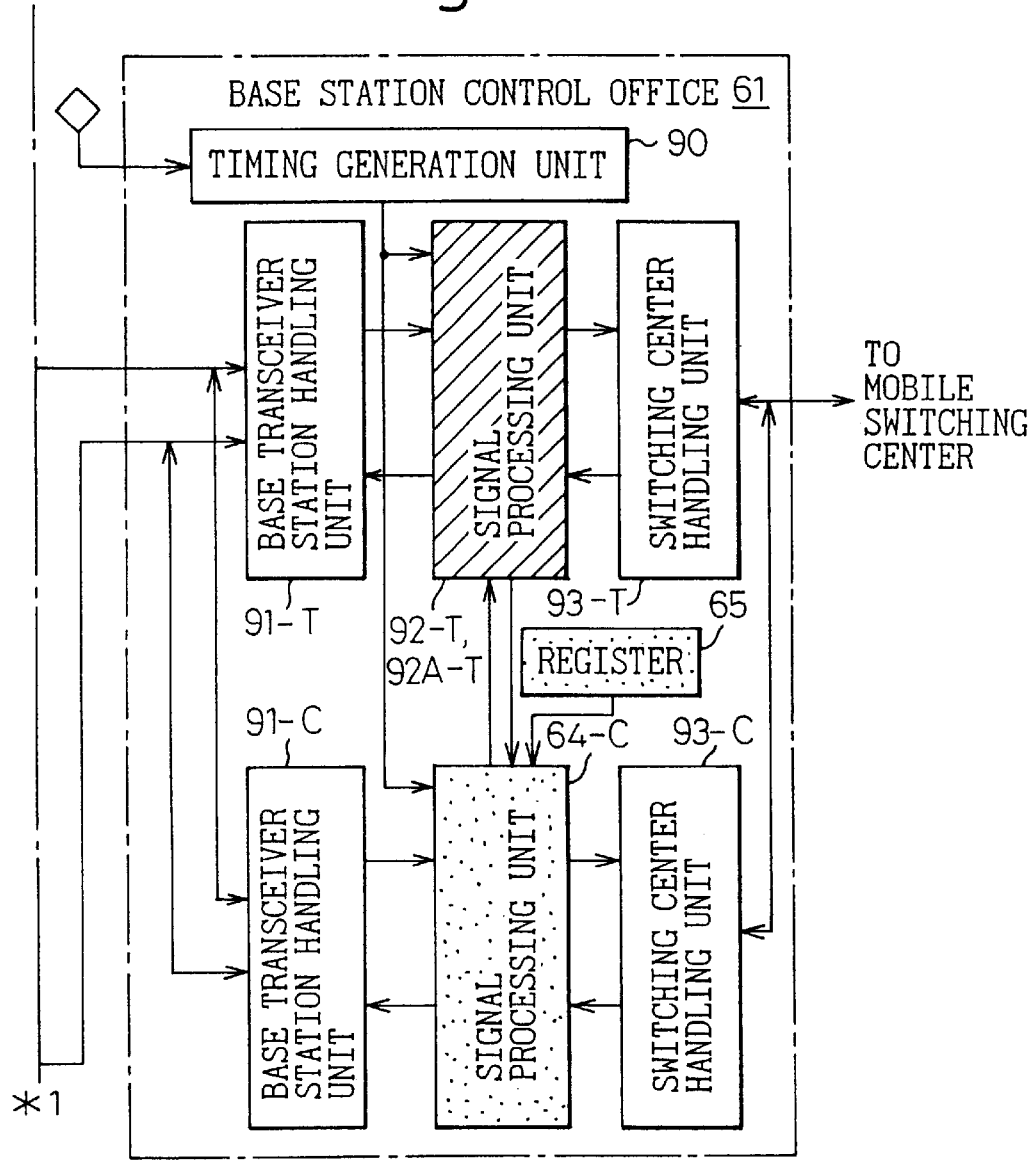

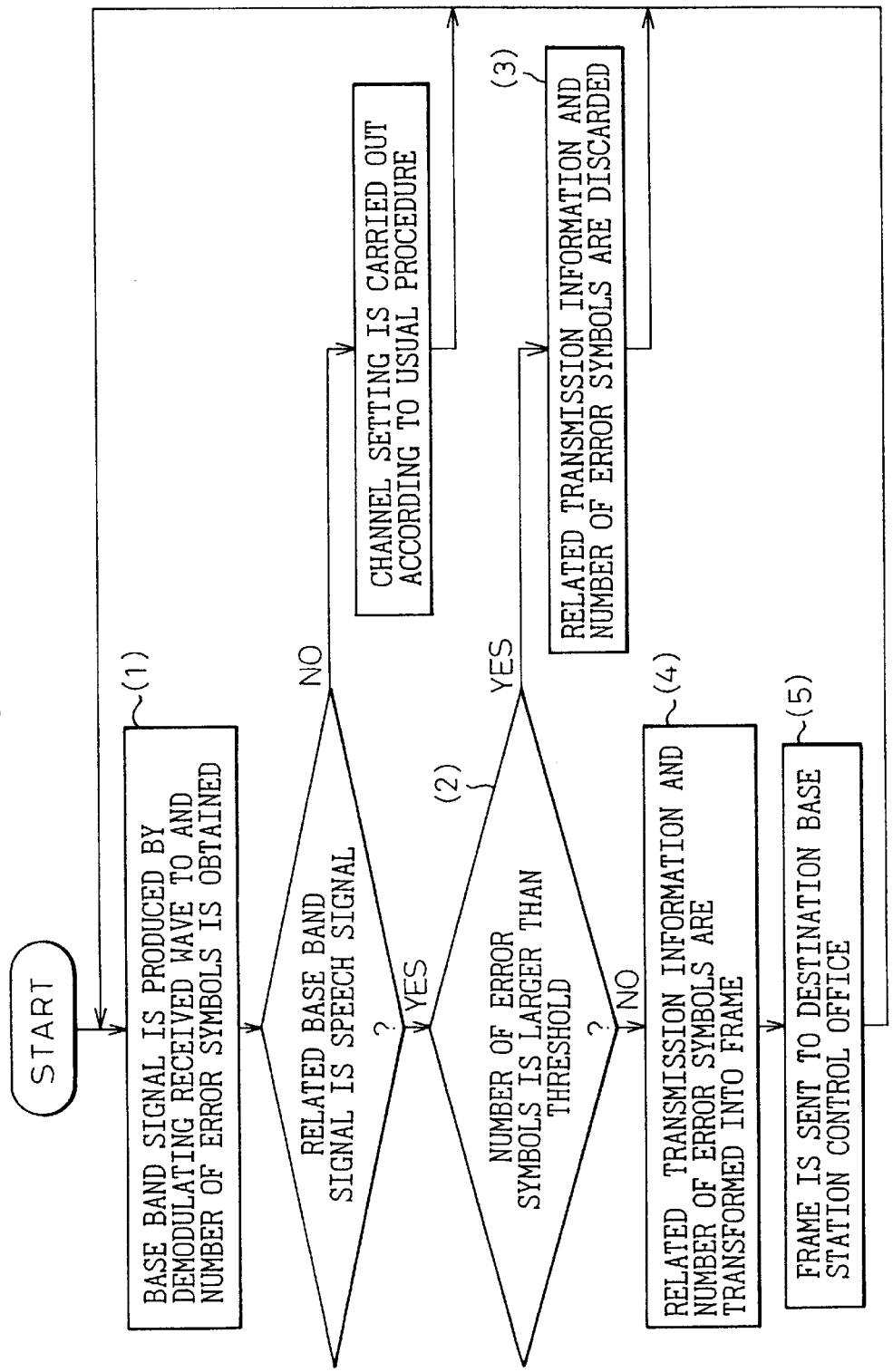

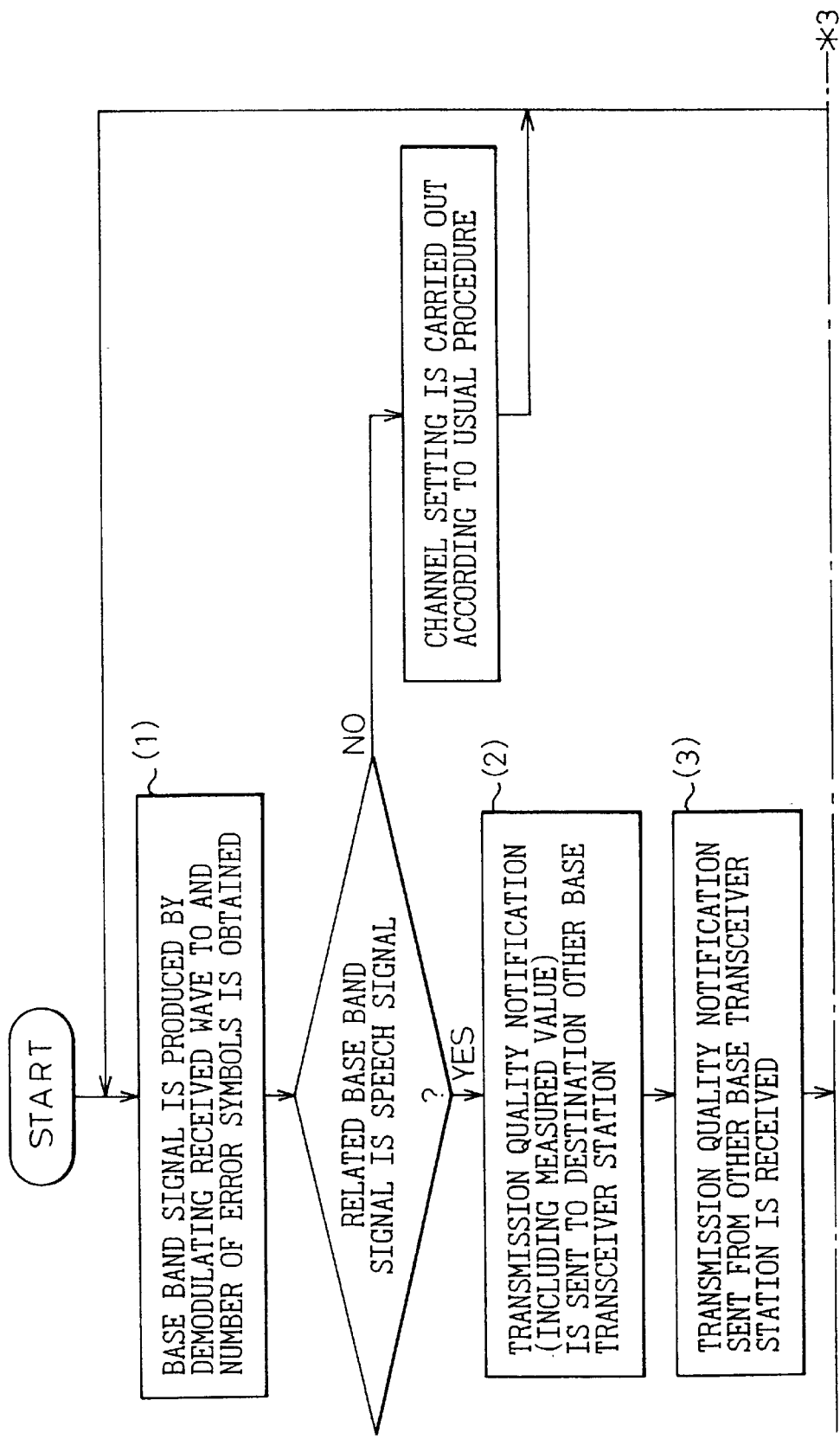

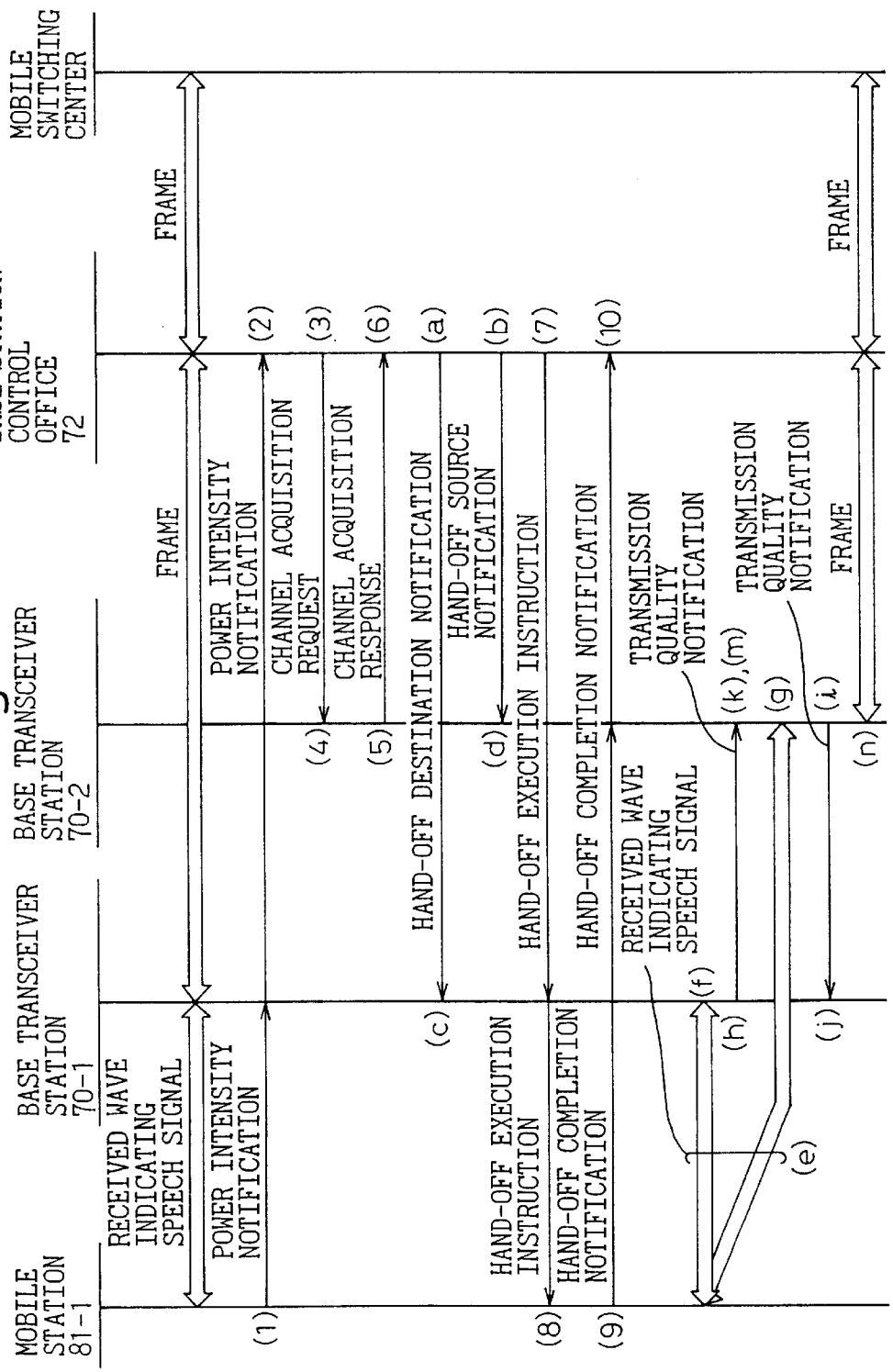

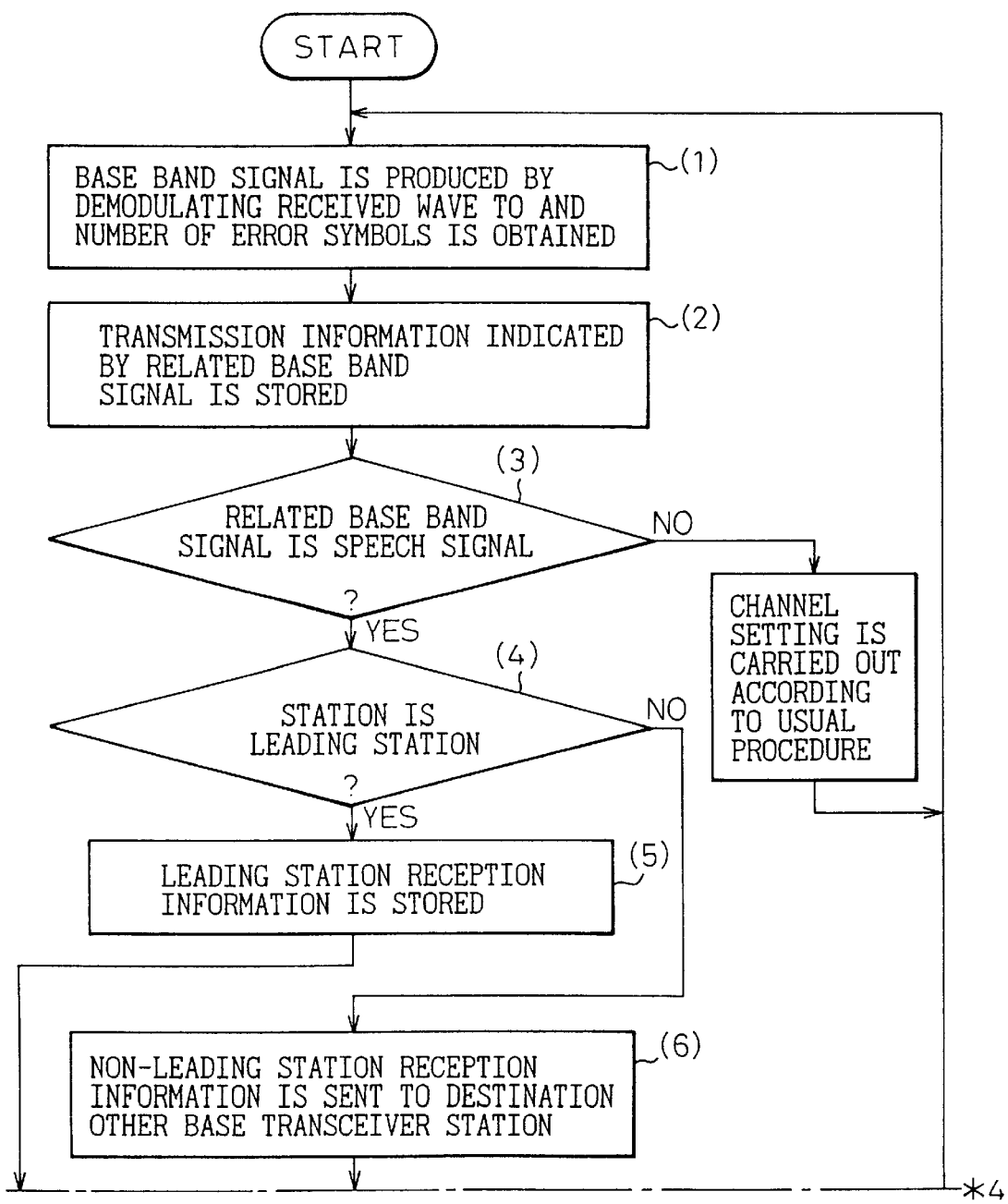

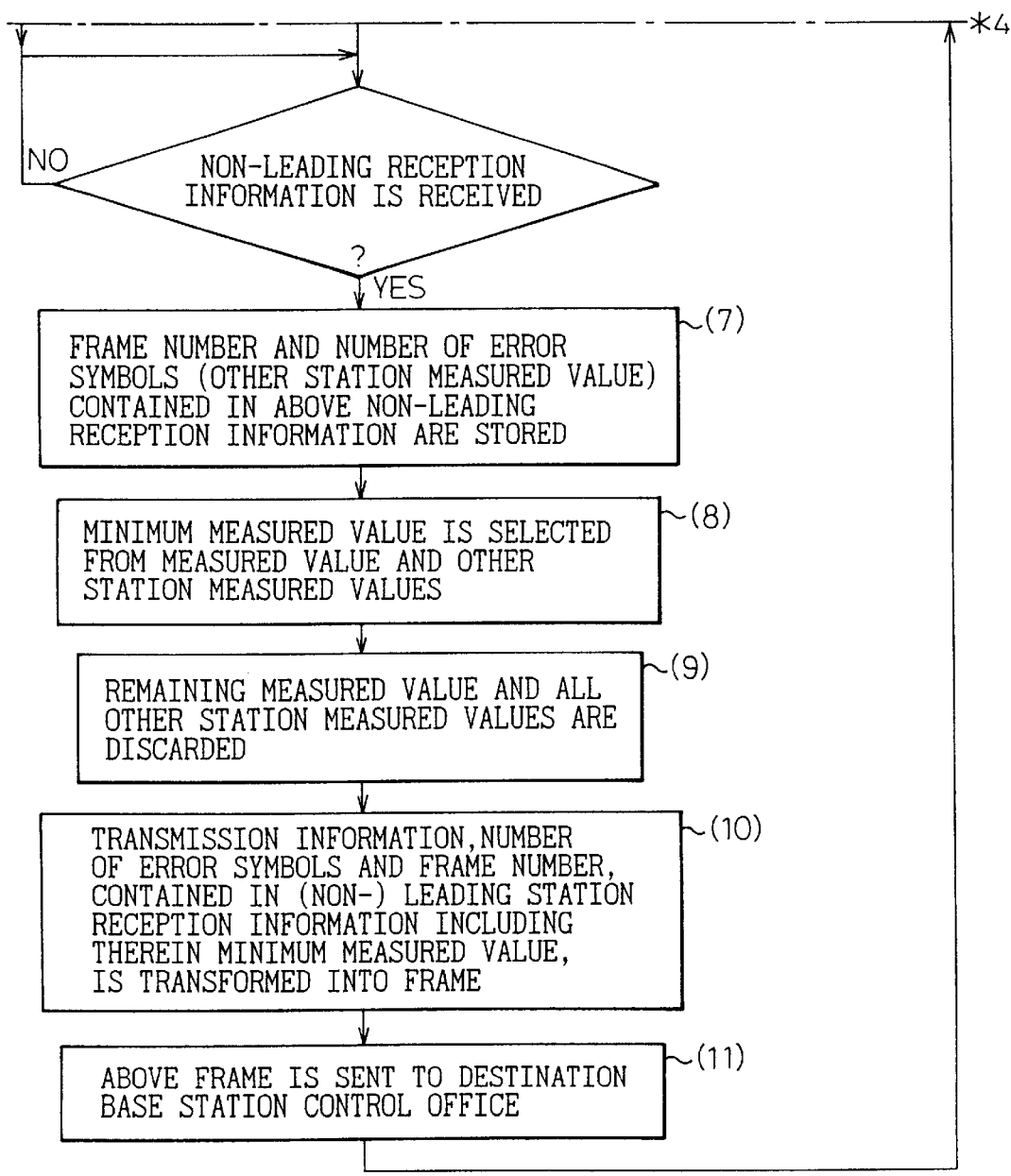

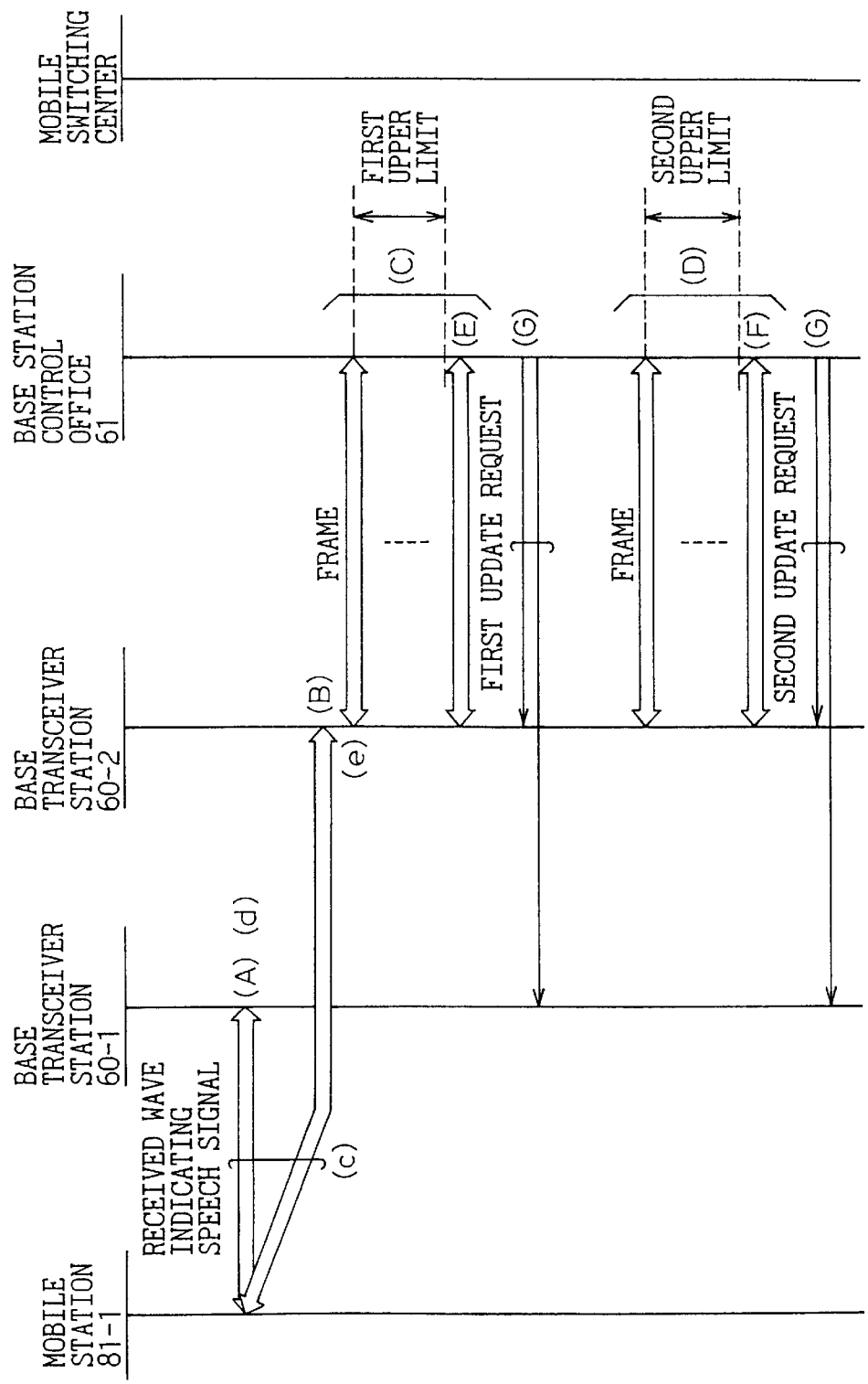

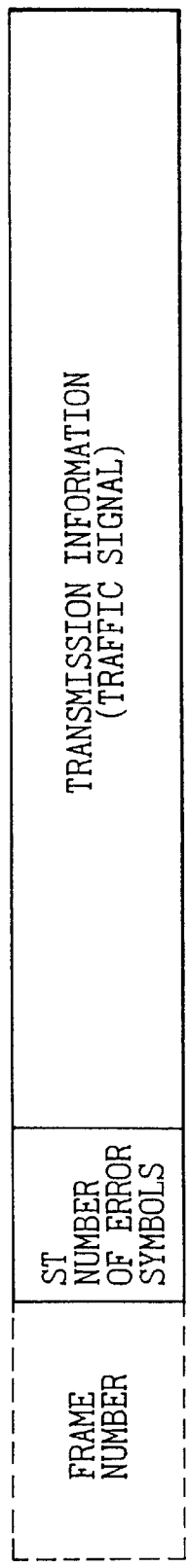

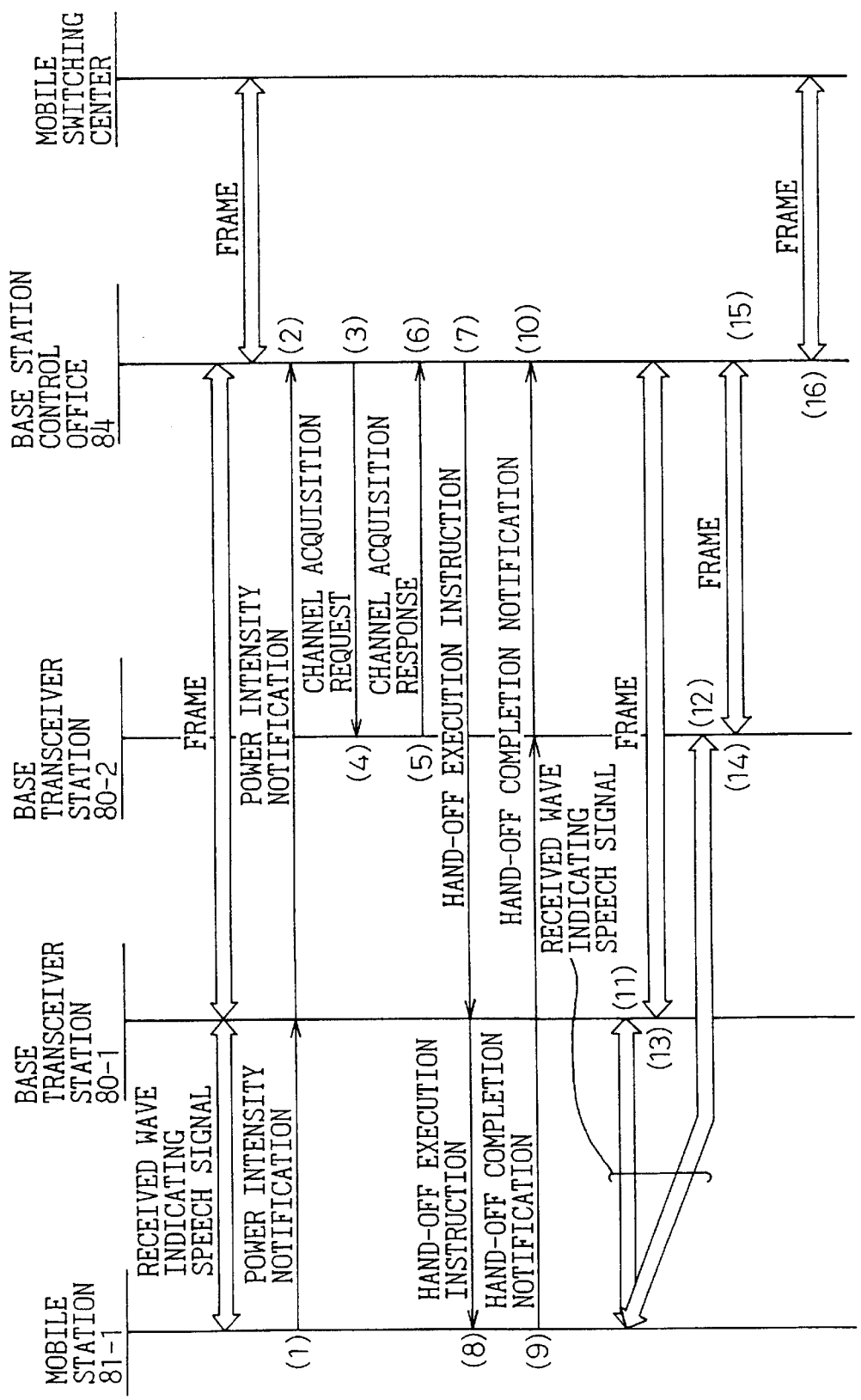

BASE TRANSCEIVER STATION EQUIPMENT AND RADIO SUBSYSTEM

BACKGROUND OF THE INVENTION

1. Field of the Invention

The present invention relates to a base transceiver station for forming radio zones in a mobile communication system and setting channels under the control of a base station control office and to a radio subsystem comprising such a base station control office and base transceiver stations.

The code division multiple access (CDMA) system has a high degree of secrecy and the property of being resistant to the effect of interference and disturbance in the radio transmission paths. Further, CDMA is now also being positively applied to mobile communication systems able to hold speech states while terminal units (mobile station) scattered throughout a radio zone are moving and able to switch (hand off) channels during speech since the technique for realizing control of the transmission power having a high response and precision has recently been established and an effective utilization of radio frequencies has become possible.

2. Description of the Related Art

As will be explained in detail later by using the drawings, in an example of the related art, when there are several radio zones covering a specific point from which a successful call can be made or several base transceiver stations receiving radio waves in parallel from a mobile station at a level enabling demodulation (including reverse spread spectrum processing) and decoding, there is a greater possibility of an increase in the number of frames given overlappingly from the base transceiver stations to the base station control office and also an increase in the traffic transmitted via communication links.

The transmission rate of these communication links, however, must be a rate high enough so that the loss probability of calls which may occur from the mobile stations at the busiest time periods can be suppressed to less than a predetermined upper limit and communication services can be provided at the desired quality of service.

Accordingly, in the related art, there was a high possibility of limitations being applied to the methods of transmission to be adopted to the communication links and the format of the control signals to be transferred in the process of channel setting, and also running costs becoming high.

Further, in the base station control office, the greater the number of frames given overlappedly, the greater the amount of processing required in the processing for receiving these frames and selecting the frame giving the smallest number ST of error symbols.

SUMMARY OF THE INVENTION

Accordingly, in consideration with the above problem, an object of the present invention is to provide base transceiver station equipment and a radio subsystem capable of reducing the amount of traffic in a transmission path formed between a base transceiver station and a base station control office without a major change of the structure.

To attain the above object, the present invention provides a base transceiver station provided with: a radio interface means for forming a radio zone, receiving signals transmitted by a mobile station located in that radio zone based on a channel setting procedure or transmitted in a speech state, and measuring the quality of transmission; an identification information acquisition means for acquiring identification information added to these received signals by a mobile station or identification information indicating a timing when those signals were received; a control means for interfacing with the radio interface means and a communication link formed with base station control equipment which takes the lead in the channel setting; and the control means transmits transmission information given as a signal with a measured quality of transmission exceeding a threshold value among signals received by the radio interface means and the identification information obtained by the identification information acquisition means for this signal to the communication link.

BRIEF DESCRIPTION OF THE DRAWINGS

The above object and features of the present invention will be more apparent from the following description of the preferred embodiments with reference to the accompanying drawings, wherein:

FIGS. 5A and 5B are views of embodiments corresponding to the first and 10th to 12th aspects of the present invention;

FIG. 6 is a flow chart of the operation of embodiments corresponding to the first and 10th to 12th aspects of the present invention;

FIGS. 9A and 9B are flow charts of the operation of the embodiment corresponding to the second aspect of the present invention;

FIG. 10 is a view for explaining the operation in the embodiment corresponding to the second aspect of the present invention;

FIGS. 11A and 11B are flow charts of the operation of the embodiment corresponding to third to ninth and 13th aspects of the present invention;

FIG. 13 is a view for explaining the operation in the embodiment corresponding to 10th to 12th aspects of the present invention;

FIG. 15 is a view of the configuration of a frame transferred via a communication link; and FIG. 16 is a view for explaining the operation in an example of the related art.

DESCRIPTION OF THE PREFERRED EMBODIMENTS

Before describing the embodiments of the present invention, the related art and the disadvantages therein will be described with reference to the related figures.

Figure 14A:
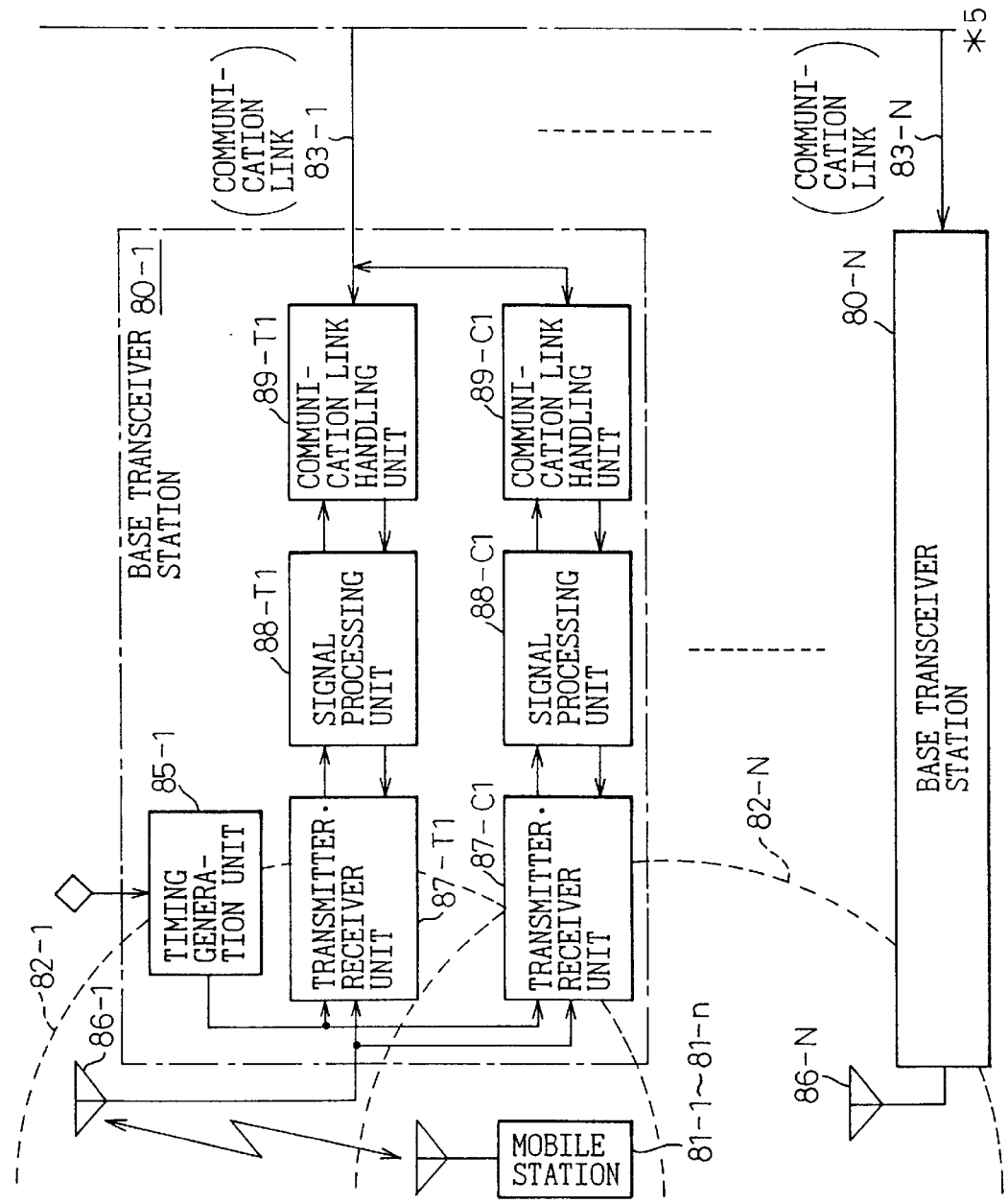
FIGS. 14A and 14B are views of an example of the configuration of a radio part of a mobile communication system to which CDMA is applied.
Figure 14B:
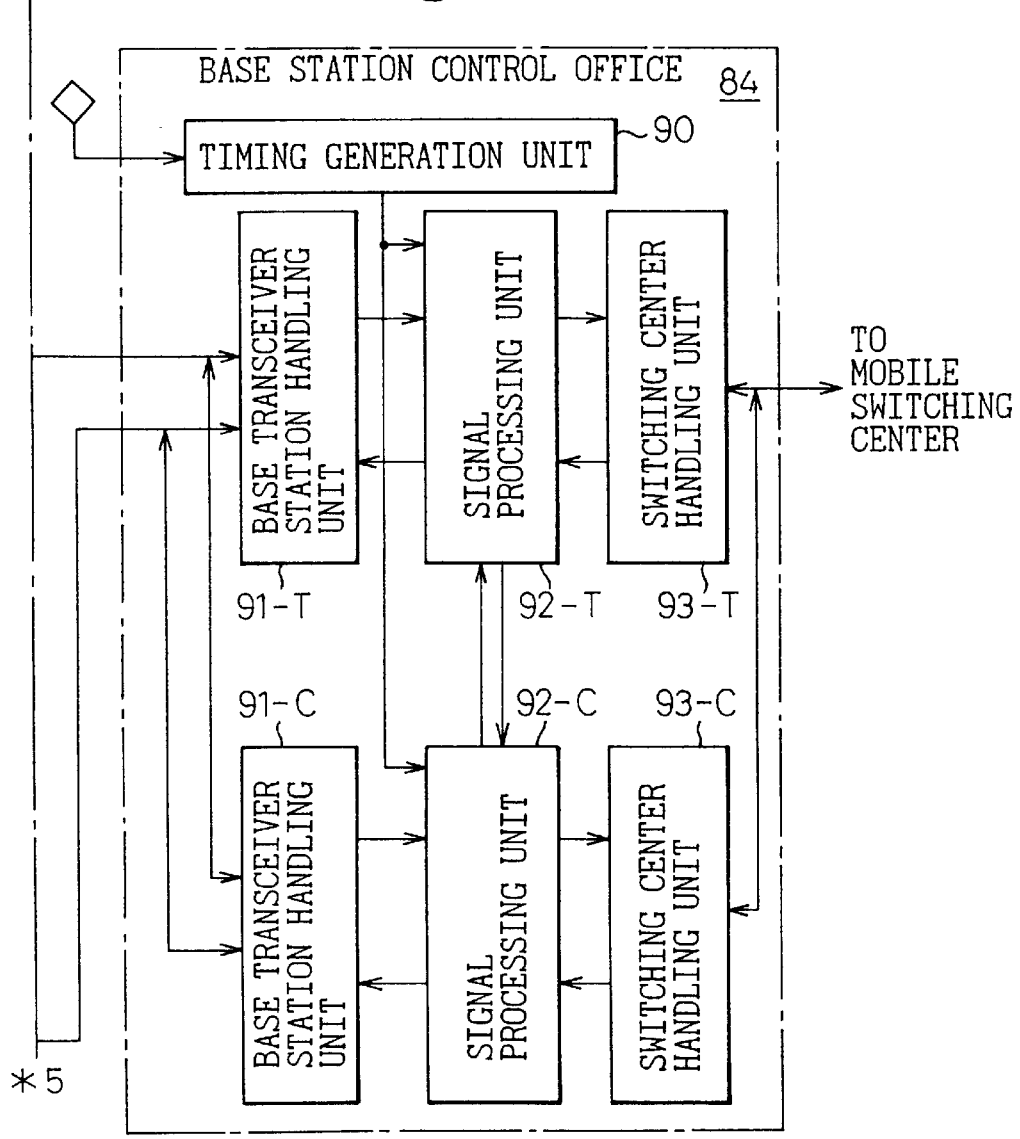

FIGS. 14A and 14B are views of an example of the configuration of a radio part of a mobile communication system to which CDMA is applied.

In the figures, base transceiver stations 80-1 to 80-N individually form radio zones 82-1 to 82-N in an area in which mobile stations 81-1 to 81-n can be located and are connected to a base station control office 84 via communication links 83-1 to 83-N. The base station control office 84 is connected to a not illustrated mobile switching center.

The base transceiver station 80-1 is comprised by a timing generation unit 85-1 including a receiver adapted to a global positioning satellite (GPS) system; transmitter-receiver units 87-C1 and 87-T1 sharing an antenna 86-1 and handling control channels to be used for channel settings regarding call origination, call termination, and home location registration and traffic channels to be used for speech, respectively, and connected to an output of the timing generation unit 85; signal processing units 88-C1 and 88-T1 individually cascade connected to these transmitter-receiver units 87-C1 and 87-T1; and communication link handling units 89-C1 and 89-T1 arranged between these signal processing units 88-C1 and 88-T1 and the communication link 83-1. Note that the configurations of the base transceiver stations 80-2 to 80-N are the same as the configuration of the base transceiver station 80-1, therefore, below, corresponding components are indicated by the same references with the suffixe "2" to "N" and explanations and illustrations thereof are omitted.

Further, the base station control office 84 is constituted by a timing generation unit 90 containing a receiver adapted to GPS; base transceiver station handling units 91-C and 91-T connected to the communication links 83-1 to 83-N respectively and individually handling the aforesaid control channels and traffic channels; signal processing units 92-C and 92-T individually cascade connected to these base transceiver station handling units 91-C and 91-T and connected to the output of a timing generation unit 90 and, at the same time, directly coupled to each other; and switching center handling units 93-C and 93-T individually arranged between the mobile switching center and these signal processing units 92-C and 92-T.

In the example of the related art having such a configuration, in the base station control office 84, the signal processing unit 92-C is linked to the mobile switching center corresponding to it via the switching center handling unit 93-C and performing the call processing of a call generated in any of the mobile stations 81-1 to 81-n and is linked to the base transceiver stations 80-1 to 80-N via the base transceiver station handling unit 91-C and communication links 83-1 to 83-N so as to perform the channel setting adapted to the call processing.

Further, in the base transceiver stations 80-1 to 80-N, the signal processing units 88-C1 to 88-CN are linked to the corresponding base station control office 84 via the communication link handling units 89-C1 to 89-CN and the communication links 83-1 to 83-N so as to transfer control signals regarding the channel settings to and from the intended mobile stations located in any of the radio zones 82-1 to 82-N among mobile stations 81-1 to 81-n via the transmitter-receiver units 87-C1 to 87-CN and antennas 86-1 to 86-N.

Note that among such channel setting and call processing procedures, the procedure adapted to the call origination, call termination, and home location registration of the mobile stations 81-1 to 81-n, the format of the signals transferred by the signal processing units 88-C1 to 88-CN and 88-T1 to 88-TN via the transmitter-receiver units 87-C1 to 87-CN and 87-T1 to 87-TN and the antennas 86-1 to 86-N based on such a procedure, and the format of the signals transferred by these signal processing units 88-C1 to 88-CN and 88-T1 to 88-TN to and from the base station control office 84 via the communication link handling units 89-C1 to 89-CN and 89-T1 to 89-TN and the communication links 83-1 to 83-N are well known techniques and therefore not related to the present invention, so explanations thereof are omitted here.

Further, when a call generated in one of the mobile stations 81-1 to 81-n, for example, the mobile station 81-1 existing in the radio zone 82-1 formed by the base transceiver station 80-1 and located at a position at which that radio zone 82-1 and the radio zone 82-2 formed by the base transceiver station 80-2 overlap, becomes a successful call (that mobile station 81-1 enters into the speech state), the processing unit 92-C mounted in the base station control office 84 allocates an empty traffic channel to be used for speech and entrusts execution of a call release concerning this successful call and the channel setting regarding the hand-off and the like to the signal processing unit 92-T.

On the other hand, in the base transceiver station 80-1, the signal processing unit 88-T1 identifies the traffic channel allocated as mentioned above via the communication link 83-1 and the communication link handling unit 89-T, shifts to that traffic channel and, at the same time, appropriately transfers the speech signal over this traffic channel via the transmitter-receiver unit 87-T1 and the antenna 86-1 and performs the signal processing necessary for realization of the channel setting regarding the call release and the hand-off.

The mobile station 81-1 identifies the times contained in radio waves successively arriving from the GPS in units of 20 ms in the speech state and then transmits the information to be transmitted toward the base transceiver station 80-1 whenever such times arrive.

Accordingly, in the base transceiver stations 80-1 and 80-2, the timing generation units 85-1 and 85-2 similarly receive radio waves arriving from the GPS and generate clock signals giving a timing of an update of times contained in the radio waves in units of 20 ms.

In the base transceiver stations 80-1 and 80-2, the transmitter-receiver units 87-T1 and 87-T2 receive the radio waves arriving from the mobile station 81-1 in synchronization with these clock signals, while the signal processing units 88-T1 and 88-T2 demodulate (including inverse spread spectrum processing) these received waves so as to extract the transmission information.

The signal processing units 88-T1 and 88-T2 find the numbers ST of error symbols (for example, symbols in which errors with respect to a normal signal point exceed the predetermined threshold value at the time of signal decision) among symbols representing the individually extracted transmission information.

Further, the signal processing units 88-T1 and 88-T2 generate, as shown in FIG. 15, in addition to the individually extracted transmission information and the numbers ST of error symbols found for that transmission information, frames comprised of a combination of frame numbers which is updated in units of 20 ms and then recyclically given by a "modulo 4" and individually transmit these frames to the base station control office 84 via the communication link handling units 89-T1 and 89-T2 and the communication links 83-1 and 83-2.

In the base station control office 84, the timing generation unit 90 receives the radio wave arriving from the GPS as mentioned above and generates a clock signal indicating the timing when the time contained in that received wave is updated in units of 20 ms.

The signal processing unit 92-T fetches and analyzes the frames received from the base transceiver station 80-1 via the communication link 83-1 and the base transceiver station handling unit 91-T as mentioned above. When the transmission information contained in that frame corresponds to a speech signal, it transmits the frames to the mobile switching center via the switching center handling unit 93-T.

Further, the mobile station 81-1 monitors, in the speech state, the levels of radio waves arriving from base transceiver stations for forming the radio zone 82-1 in which that station (81-1) exists and the individual radio zones adjoining this radio zone 82-1 or overlapping this. When for example the level of the received wave arriving from the base transceiver station 80-2 exceeds the level of the received wave arriving from the base transceiver station 80-1 forming this radio zone 82-1, it transmits a "power intensity notification" containing the identification information of that base transceiver station 80-2 (radio zone 82-2) and indicating that a hand-off is to be carried out to a traffic channel used for speech (see FIG. 16(1)).

In the base transceiver station 80-1, the transmitter-receiver unit 87-T1, signal processing unit 88-T1, and the communication link handling unit 89-T1 are linked to each other as already mentioned so as to send the "power intensity notification" to the communication link 83-1.

In the base station control office 84, when receiving the "power intensity notification" from the communication link 83-1 via the base transceiver station handling unit 91-T and recognizing this in the analysis process (FIG. 16(2)), the signal processing unit 92-T sends a "channel acquisition request" to the communication link 83-2 formed with the base transceiver station indicated by the identification information contained in this "power intensity notification" among the communication links 83-2 to 83-N (FIG. 16(3)).

In the base transceiver station 80-2, when the "channel acquisition request" is given from the communication link 83-2 via the communication link handling unit 89-T2, the signal processing unit 88-T2 acquires a traffic channel (hereinafter referred to as a "destination candidate channel") which had not been allocated to any call (mobile station) at that timing among the traffic channels allocated to it (80-2) (FIG. 16(4)). Further, the signal processing unit 88-T2 generates a "channel acquisition response" containing a unique channel number indicating the destination candidate channel and sends the "channel acquisition response" to the communication link 83-2 via the communication link handling unit 89-T2 (FIG. 16(5)).

In the base station control office 84, when fetching and recognizing this "channel acquisition response" via the base transceiver station handling unit 91-T in the same way as the case of the "power intensity notification" (FIG. 16(6)), the signal processing unit 92-T generates a "hand-off execution instruction" containing the channel number contained in that "channel acquisition response".

Further, the signal processing unit 92-T sends the "hand-off execution instruction" to the communication link 83-1 via the base transceiver station handling unit 91-T.

In the base transceiver station 80-1, when this "hand-off execution instruction" is given via the communication link handling unit 89-T1, the signal processing unit 88-T1 sends the "hand-off execution instruction" to the mobile station 81-1 via the transmitter-receiver unit 87-T1 and the antenna 86-1.

When recognizing this "hand-off execution instruction" (FIG. 16(8)), the mobile station 81-1 shifts to the destination candidate channel indicated by the channel number contained in the "hand-off execution instruction". Further, when completing a continuity check based on a predetermined procedure via the destination candidate channel, the mobile station 81-1 sends a "hand-off completion notification" indicating this fact to this destination candidate channel (FIG. 16 (9)).

This "hand-off completion notification" is given to the base station control office 84 in the same way as the case of the "power intensity notification" via the base transceiver station 80-2 and the communication link 83-2.

In the base station control office 84, when recognizing the "hand-off completion notification", the signal processing unit 92-T recognizes the completion of the hand-off processing activated in response to the "power intensity notification" (FIG. 16(10)).

Further, in such a state, when the mobile station 81-1 is located at a position at which the radio zones 82-1 and 82-2 formed by the base transceiver stations 80-1 and 80-2 overlap, received waves indicating the speech signal are given in parallel to the signal processing units 88-T1 and 88-T2 mounted in these base transceiver stations 80-1 and 80-2 (FIGS. 16(11) and 16(12)).

The signal processing units 88-T1 and 88-T2 generate frames shown in FIG. 15 (each formed by combining a number ST of error symbols and a frame number with the transmission information) in parallel as already mentioned, and then send these frames to the communication links 83-1 and 83-2 respectively (FIGS. 16(13) and 16(14)).

In the base station control office 84, the signal processing unit 92-T identifies a group of frames having the same frame number among these frames in the order of time. Further, the signal processing unit 92-T sequentially selects a single frame having the minimum contained error symbol number ST among individually contained frames for these groups (FIG. 16 (15)).and further sends the single frame to the mobile switching center via the switching center handling unit 93-T (FIG. 16(16)).

Namely, between the mobile station 81-1 and the base station control office 84, paths individually corresponding to all radio zones in which the mobile station 81-1 is located are formed in parallel.

Accordingly, the mobile station 81-1 can maintain the speech state with a good quality of speech by performing a soft hand-off flexibly adapted to fluctuations in the transmission characteristic of the radio transmission path.

Note that, in the aforementioned related art, the process of the hand-off achieved by linkage of the signal processing units 88-T1, 88-T2, and 92-T corresponding to the traffic channel is shown.

Further, in the aforementioned related art, the transmitter-receiver units 87-C1 and 87-T1, signal processing units 88-C1 and 88-T1, and the communication link handling units 89-C1 and 89-T1 are provided in the base transceiver station 80-1 individually corresponding to the control channel and the traffic channel, while the base transceiver station handling units 91-C and 91-T, signal processing units 92-C and 92-T, and the switching center handling units 93-C and 93-T are provided in the base station control office 84. Here, it is possible not to adopt any functional dispersion and load dispersion for components corresponding to these control channel and traffic channel.

Further, in the aforementioned related art, all or part of the transmitter-receiver units 87-C1 and 87-T1, signal processing units 88-C1 and 88-T1, and the communication link handling units 89-C1 and 89-T1 constituting the base transceiver station 80-1 and the base transceiver station handling units 91-C and 91-T, signal processing units 92-C and 92-T, and the switching center handling units 93-C and 93-T constituting the base station control office 84 are provided with a buffer memory in which the transmission information and frames to be transferred are temporarily stored and which absorbs the difference of individual responses, but such a buffer memory is not related to the present invention at all, so the explanation thereof is omitted.

In the related art, as already mentioned, when there are several radio zones covering a specific point at which a successful call can be made or several base transceiver stations receiving radio waves in parallel from a mobile station at a level large enough to enable demodulation (including reverse spread spectrum processing) and decoding, there is a large possibility of an increase in the number of frames given overlappingly from the base transceiver stations 80-1 to 80-N to the base station control office 84 and an increase in the traffic which can be transmitted via the communication links 83-1 to 83-N.

The transmission rate of these communication links 83-1 to 83-N, however, must be a rate high enough so that the loss probability of calls which may occur from the mobile stations 81-1 to 81-n at the busiest time periods can be suppressed to less than a predetermined upper limit and communication services can be provided at the desired quality of service.

Accordingly, in the related art, there was a high possibility of limitations being applied to the methods of transmission to be applied to the communication links 83-1 to 83-N and the format of the control signals to be transferred in the process of channel setting, and also running costs becoming high.

Further, in the base station control office 84, the greater the number of frames given overlappedly, the greater the amount of processing required in the processing for receiving these frames and selecting the frame giving the smallest number ST of error symbols as already mentioned.

The present invention provides a base transceiver station equipment and a radio subsystem capable of reducing the amount of traffic in a transmission path formed between a base transceiver station and a base station control office without a major change of the structure.

Note that the present invention explained in detail later includes first to 13th aspects related to each other. The interrelation of these aspects is as follows.

The first to fourth aspects are independent from each other.

The fifth aspect is subordinate to each of the third and fourth aspects.

The sixth aspect is subordinate to each of the third to fifth aspects.

The seventh aspect is subordinate to each of the fourth to sixth aspects.

The eighth aspect is subordinate to each of the first to fourth aspects.

The ninth aspect is subordinate to each of the second to eighth aspects.

The 10th aspect is subordinate to each of the first and fourth aspects.

The 11th aspect is subordinate to each of the first and fourth aspects.

The 12th aspect is subordinate to each of the first to eighth aspects.

The 13th aspect is subordinate to each of the 10th to 12th aspects.

Figure 1:
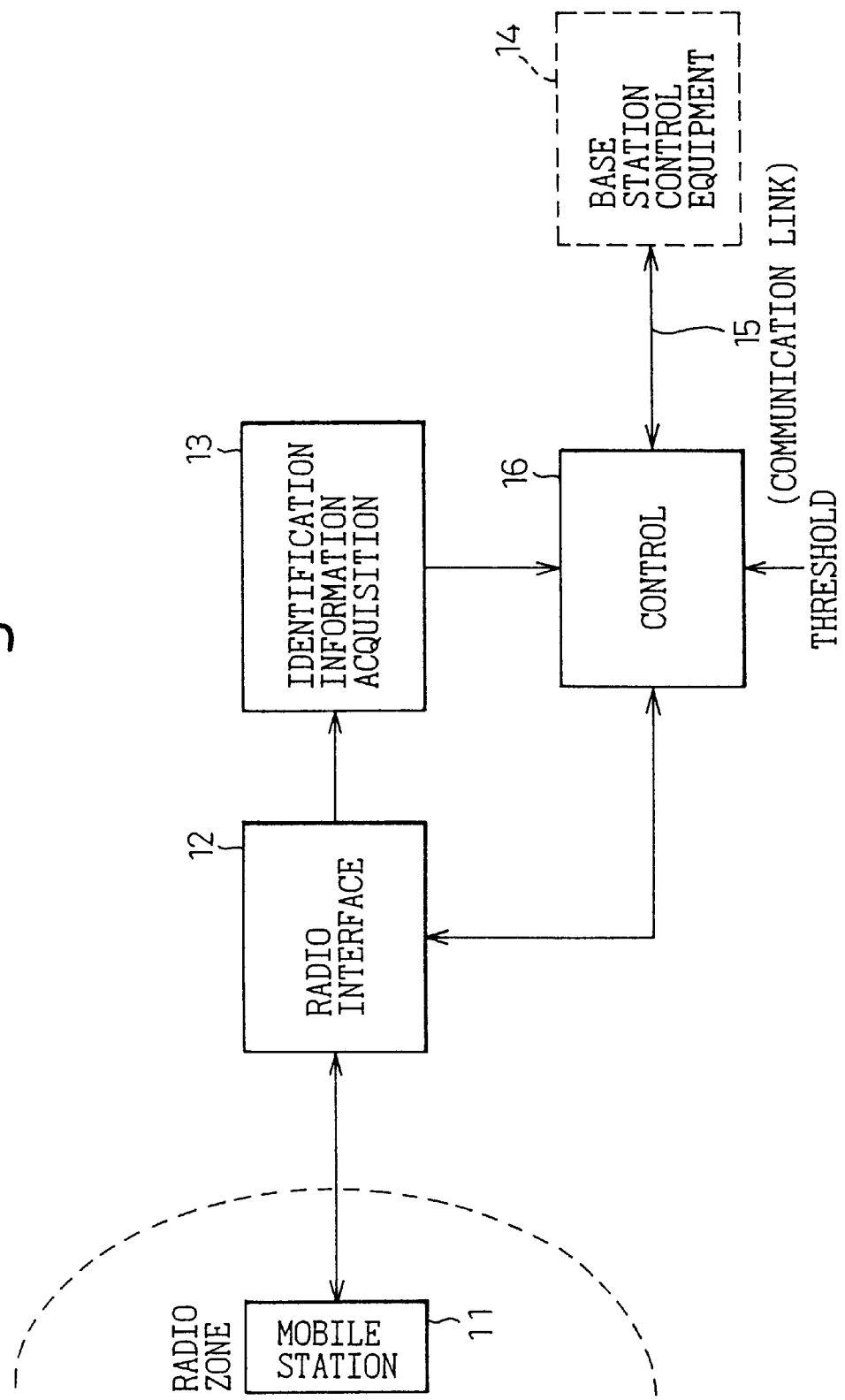
FIG. 1 is a principal block diagram of the first and eighth aspects of the present invention.

FIG. 1 is a principal block diagram of first and eighth aspects of the present invention.

According to the first aspect of the present invention, there is provided base transceiver station equipment provided with: a radio interface means 12 which forms a radio zone, receives a signal transmitted from a mobile station 11 located in that radio zone according to a channel setting procedure or transmitted in a speech state, and measures a quality of transmission of that signal; an identification information acquisition means 13 for acquiring identification information added to the signal received by the radio interface means 12 from the mobile station 11 or identification information indicating a timing of the reception of that signal; and a control means 16 for interfacing with the radio interface means 12 and a communication link 15 connected with a base station control equipment 14 for leading the channel setting. The control means 16 transmits to the communication link 15 the transmission information given as a signal with a quality of transmission measured by the radio interface means 12 exceeding a predetermined threshold value among the signals received by the radio interface means 12 and the identification information obtained by the identification information acquisition means 13 for this signal.

Figure 2:
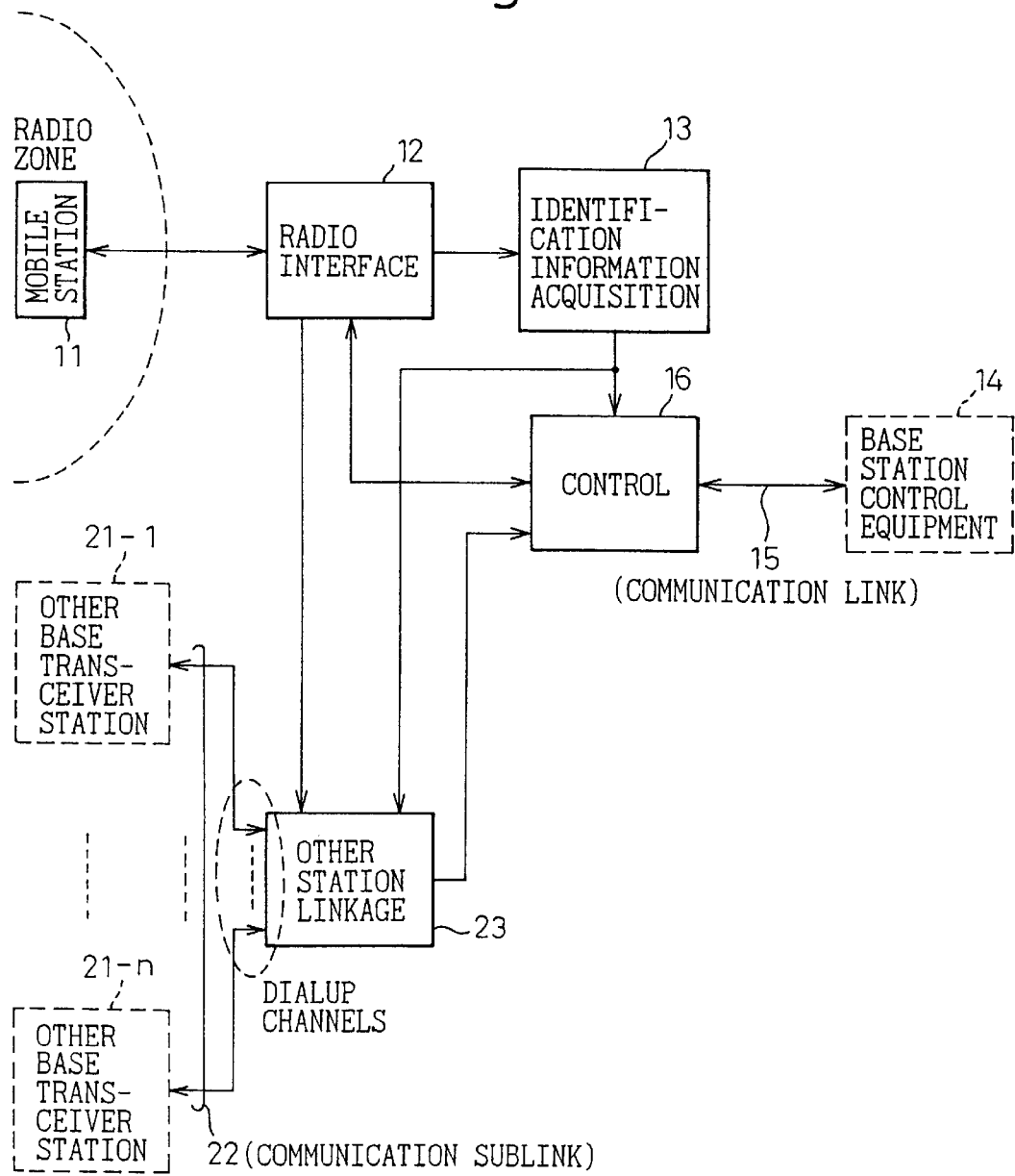
FIG. 2 is a principal block diagram of the second and ninth aspects of the present invention.

FIG. 2 is a principal block diagram of the second and ninth aspects of the present invention.

According to the second aspect of the present invention, there is provided base transceiver station equipment provided with: a radio interface means 12 which forms a radio zone, receives a signal transmitted from a mobile station 11 located in that radio zone according to a channel setting procedure or transmitted in the speech state, and measures the quality of transmission of that signal; an identification information acquisition means 13 for acquiring identification information added to a signal received by the radio interface means 12 from the mobile station 11 or identification information indicating the timing of the reception of that signal; and a control means 16 for interfacing with the radio interface means 12 and a communication link 15 connected with a base station control equipment 14 for leading the channel setting; and an other station linkage means 23 which sends a combination of the quality of transmission measured by the radio interface means 12 and the identification information obtained by the identification information acquisition means 13 for the signal received with that quality of transmission to communication sublinks 22 formed with other base transceiver stations 21-1 to 21-n forming radio zones different from the radio zone and receives a combination of a quality of transmission and identification information transmitted to the communication sublinks 22 by these other base transceiver stations 21-1 to 21-n. The control means 16 compares all of the transmission qualities forming combinations with identification information the same as the identification information obtained by the identification information acquisition means 13 among the transmission qualities contained in the combinations received by the other station linkage means 23 with the quality of transmission measured by the radio interface means 12 and when the latter exceeds the former, transmits to the communication link 15 the signal received by the radio interface means 12 for which this quality of transmission being measured is sent.

Figure 3:
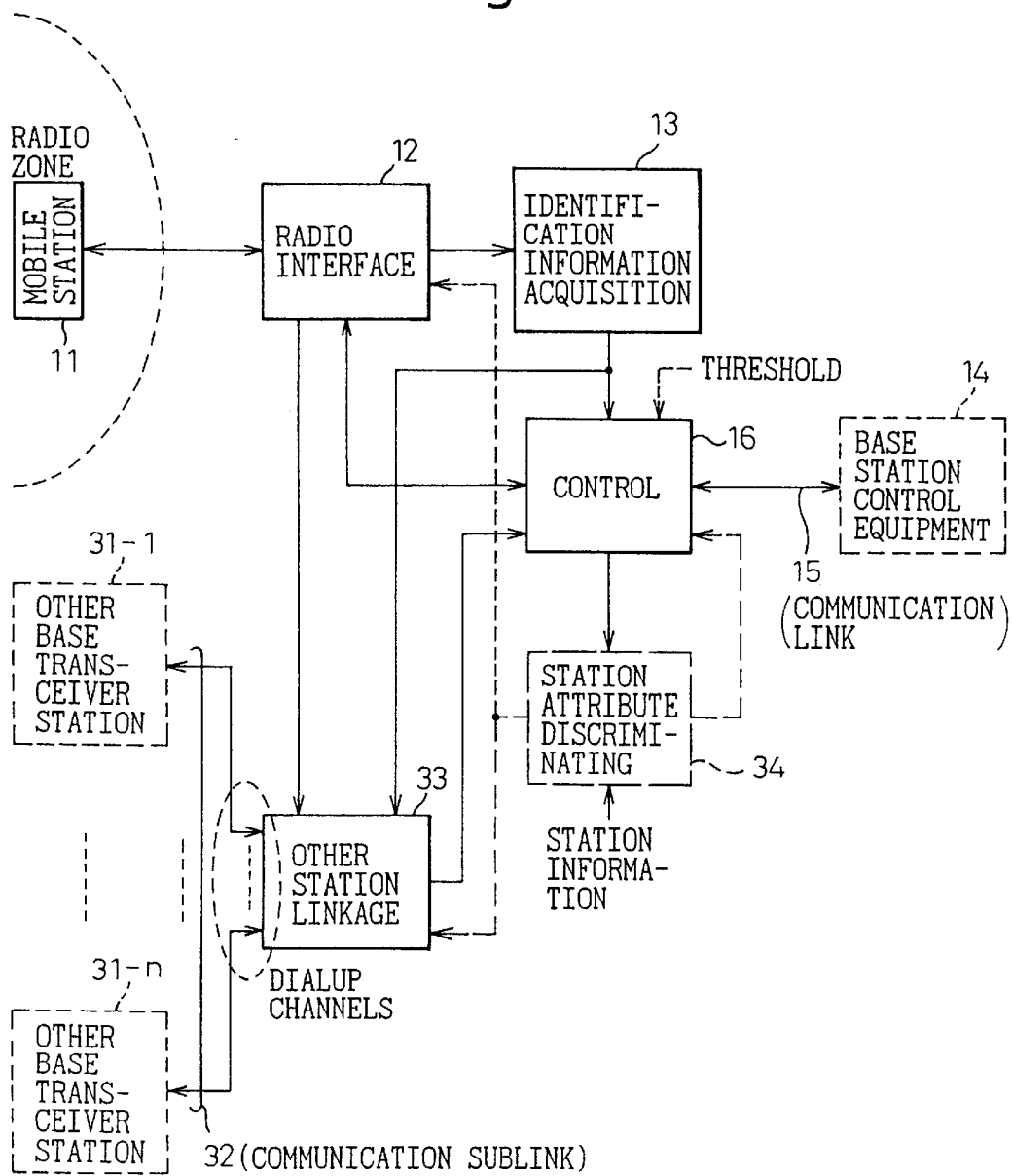
FIG. 3 is a principal block diagram of the third to ninth aspects of the present invention.

FIG. 3 is a principal block diagram of the third to ninth aspects of the present invention.

According to the third aspect of the present invention, there is provided base transceiver station equipment provided with: a radio interface means 12 which forms a radio zone, receives a signal transmitted from a mobile station 11 located in that radio zone according to a channel setting procedure or transmitted in the speech state, and measures the quality of transmission of that signal; an identification information acquisition means 13 for acquiring identification information added to a signal received by the radio interface means 12 from the mobile station 11 or identification information indicating the timing of the reception of that signal; and a control means 16 for interfacing with the radio interface means 12 and a communication link 15 connected with a base station control equipment 14 for leading the channel setting; an other station linkage means 33 which sends a combination of a signal received by the radio interface means 12 and identification information obtained by the identification information acquisition means 13 to communication sublinks 32 formed with other base transceiver stations 31-1 to 31-n forming radio zones different from the radio zone, receives combinations transmitted to the communication sublinks 32 by other base transceiver stations 31-1 to 31-n, and measures the quality of transmission; and a station attribute discriminating means 34 which discriminates whether or not it is itself a specific station based on one or both of the station information and the channel setting procedure. The control means 16 sends to the communication link 15 the signal corresponding to the individual identification information obtained by the identification information acquisition means 13 and having a maximum value of the quality of transmission measured by the radio interface means 12 and the other station linkage means 33 among the signal received by the radio interface means 12 and signals contained in the combinations received by the other station linkage means 33 only when the result of the discrimination carried out by the station attribute discriminating means 34 is "true".

According to the fourth aspect of the present invention, there is provided provided base transceiver station equipment provided with: a radio interface means 12 which forms a radio zone, receives a signal transmitted from a mobile station 11 located in that radio zone according to a channel setting procedure or transmitted in the speech state, and measures the quality of transmission of that signal; an identification information acquisition means 13 for acquiring identification information added to a signal received by the radio interface means 12 from a mobile station 11 or identification information indicating the timing of the reception of that signal; and a control means 16 for interfacing with the radio interface means 12 and a communication link 15 connected with a base station control equipment 14 for leading the channel setting; an other station linkage means 33 which sends a combination of a signal received by the radio interface means 12 and identification information obtained by the identification information acquisition means 13 to communication sublinks 32 formed with the other base transceiver stations 31-1 to 31-n forming radio zones different from that radio zone, receives combinations transmitted to the communication sublinks 32 by these other base transceiver stations 31-1 to 31-n, and measures the quality of transmission; and a station attribute discriminating means 34 which discriminates whether or not it is itself the specific station based on the one or both of the station information and the channel setting procedure. The control means 16 sends to the communication link 15 the signal corresponding to individual identification information obtained by the identification information acquisition means 13 and the quality of transmission measured by the radio interface means 12 and the other station linkage means 33 exceeding a threshold value among the signal received by the radio interface means 12 and signals contained in the combinations received by the other station linkage means 33 only when the result of the discrimination carried out by the station attribute discriminating means 34 is "true".

According to the fifth aspect of the present invention, there is provide base transceiver station equipment according to the third and fourth aspects, wherein the radio interface means 12 measures the quality of transmission only when the result of the discrimination carried out by the station attribute discriminating means 34 is "true".

According to the sixth aspect of the present invention, there is provide base transceiver station equipment according to the third to fifth aspects, wherein the other station linkage means 33 measures the quality of transmission only when the result of the discrimination carried out by the station attribute discriminating means 34 is "true".

According to the seventh aspect of the present invention, there is provided base transceiver station equipment according to the fourth to sixth aspects, wherein the other station linkage means 33 sends a combination of the signal received by the radio interface means 12 and the quality of transmission measured for that signal to the communication sublinks 32 only when the result of the discrimination carried out by the station attribute discriminating means 34 is "false".

According to the eighth aspect of the present invention, there is provided base transceiver station equipment according to the first and fourth aspects, wherein the control means 16 adopts a value theoretically calculated in advance based on the zone configuration or found by actual measurement as the threshold value.

According to the ninth aspect of the present invention, there is provided base transceiver station equipment according to the second to eighth aspects, wherein the other station linkage means 23 and 33 have means for discriminating whether or not there is any signal or quality of transmission to be transmitted to the communication sublinks 22 and 32 and forming communication sublinks 22 and 32 via dialup channels during a period for which the result of the discrimination is "true".

Figure 4:
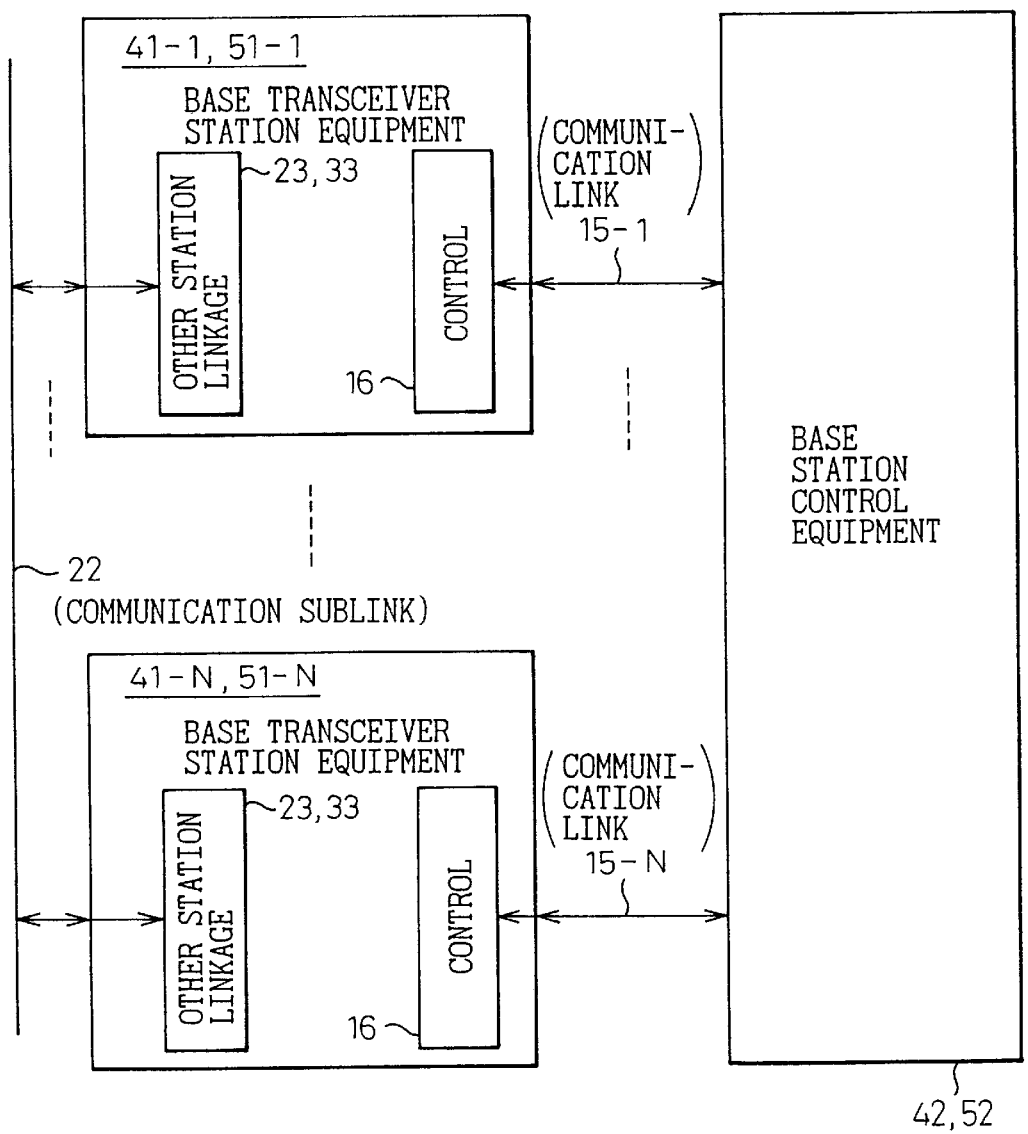
FIG. 4 is a principal block diagram of the 10th to 13th aspects of the present invention.

FIG. 4 is a block diagram of the 10th to 13th aspects of the present invention.

According to the 10th aspect of the present invention, there is provided a radio subsystem according to the first and fourth aspects provided with a plurality N of base transceiver station equipment 41-1 to 41-N and base station control equipment 42 for performing channel setting regarding mobile stations located in radio zones individually formed by these base transceiver station equipment 41-1 to 41-N via a plurality N of communication links 15-1 to 15-N individually formed with the plurality of base transceiver station equipment 41-1 to 41-N, wherein the base station control equipment 42 has a means for measuring a length of a period during which the corresponding identification information overlap for one or both of the signals to be given via the plurality N of communication links 15-1 to 15-N and the qualities of transmission of the signals and updating the threshold value to a larger value when this length exceeds the predetermined upper limit and the control means 16 provided in the plurality N of base transceiver station equipment 41-1 to 41-N adopt the threshold value updated by the base station control equipment 42 with priority.

According to the 11th aspect of the present invention, there is provided a radio subsystem according to the first and fourth aspects provided with a plurality N of base transceiver station equipment 41-1 to 41-N and base station control equipment 42 for performing channel setting regarding mobile stations located in radio zones individually formed by these base transceiver station equipment 41-1 to 41-N via a plurality N of communication links 15-1 to 15-N individually formed with the plurality of base transceiver station equipment 41-1 to 41-N, wherein the base station control equipment 42 has a means for measuring the length of a period during which no corresponding identification information is given for one or both of the signals to be given via the plurality N of communication links 15-1 to 15-N and the qualities of transmission of the signals and updating the threshold value to a smaller value when this length exceeds a predetermined upper limit and the control means 16 provided in the plurality N of base transceiver station equipment 41-1 to 41-N adopt the threshold value updated by the base station control equipment 42 with priority.

According to the 12th aspect of the present invention, there is provided a radio subsystem according to the first to eighth aspects provided with a plurality N of base transceiver station equipment 51-1 to 51-N and base station control equipment 52 for performing channel setting regarding mobile stations located in radio zones individually formed by these base transceiver station equipment 51-1 to 51-N via a plurality N of communication links 15-1 to 15-N individually formed with the plurality of base transceiver station equipment 51-1 to 51-N, wherein the base station control equipment 52 updates a threshold value based on one or both of station information and a channel setting procedure and the control means 16 provided in the plurality N of base transceiver station equipment 51-1 to 51-N adopt the threshold value updated by the base station control equipment 52 with priority.

According to the 13th aspect of the present invention, there is provided a radio subsystem according to the 10th to 12th aspects, wherein each of the other station linkage means 23 and 33 provided in the plurality of base transceiver station equipment 41-1 to 41-N and 51-1 to 51-N has means for specifying the other base transceiver station equipment which becomes the destination of the signal or quality of transmission transmitted via the communication sublink 22 based on the station information or the channel setting procedure and forming a path on the communication sublink 22 limited with these other base transceiver station equipment.

Next, the mode of operation and advantages of each of the aspects will be explained.

In the base transceiver station equipment according to the first aspect of the present invention, the radio interface means 12 forms a radio zone, receives a signal transmitted by a mobile station 11 located in that radio zone according to the channel setting procedure or transmitted in the speech state, and measures the quality of transmission of the signal. The identification information acquisition means 13 acquires identification information added to this received signal by the mobile station 11 or identification information indicating the timing of the reception of the signal. The control means 16 interfaces between the communication link 15 formed with the base station control equipment 14 for leading the channel setting and the radio interface means 12 and sends the transmission information given as a signal with a measured quality of transmission exceeding a predetermined threshold value among the signals received by the radio interface means 12 and the identification information obtained by the identification information acquisition means 13 for this signal to the communication link 15.

Such identification information includes a speech signal used for speech and the control information to be applied to the channel setting, therefore, irrespective of the quality of transmission of the signal received by the radio interface means 12, the traffic of the communication link 15 or an hour ratio required for forming the path on this communication link 15 is reduced in comparison with the related art in which the transmission information given as the signal and the identification information obtained by the identification information acquisition means 13 for this signal are transmitted to the communication link 15.

In the base transceiver station equipment according to the second aspect of the present invention, the radio interface means 12 forms a radio zone, receives a signal transmitted by a mobile station 11 located in that radio zone according to the channel setting procedure or transmitted in the speech state, and measures the quality of transmission of the signal. The identification information acquisition means 13 acquires identification information added to a signal received by the radio interface means 12 from a mobile station 11 or identification information indicating the timing of reception of that signal.

The other station linkage means 23 sends a combination of the quality of transmission measured by the radio interface means 12 and the identification information obtained by the identification information acquisition means 13 for the signal received with that quality of transmission to communication sublinks 22 formed with the other base transceiver stations 21-1 to 21-n forming radio zones different from the radio zone and receives combinations of the quality of transmission and the identification information transmitted to the communication sublinks 22 by these other base transceiver stations 21-1 to 21-n.

The control means 16 interfaces between the communication link 15 formed with the base station control equipment 14 for leading the channel setting and the radio interface means 12 and then compares all of the transmission qualities forming combinations with identification information the same as the identification information obtained by the identification information acquisition means 13 among the transmission qualities contained in the combinations received by the other station linkage means 23 and the quality of transmission measured by the radio interface means 12. When the latter exceeds the former, it sends a signal with a quality of transmission measured by the radio interface means 12 to the communication link 15.

Namely, in the base transceiver station to which the present invention is applied, the transmission qualities of signals arriving in parallel at the other base transceiver stations 21-1 to 21-n from the mobile station 11 are notified, then the signal received by the radio interface means 12 at the same station is transmitted to the base station control equipment 14 via the communication link 15 only in a case where the quality of transmission of that signal is higher than any quality of transmission notified in this way.

Accordingly, the signals transferred to the base station control equipment 14 among signals arriving from the mobile station 11 at a plurality of base transceiver stations in parallel are limited to those having a high quality of transmission by linkage of these base transceiver stations via the communication sublinks 22. In comparison with the first aspect of the present invention, the traffic over the communication link 15 or the hour ratio required for the formation of paths on the communication links 15 is reduced.

In the base transceiver station equipment according to the third aspect of the present invention, the radio interface means 12 forms a radio zone, receives a signal transmitted by a mobile station 11 located in that radio zone according to the channel setting procedure or transmitted in the speech state, and measures the quality of transmission of the signal. The identification information acquisition means 13 acquires identification information added to a signal received by the radio interface means 12 from a mobile station 11 or identification information indicating the timing of reception of that signal.

The other station linkage means 33 sends a combination of the signal received by the radio interface means 12 and the identification information obtained by the identification information acquisition means 13 to the communication sublinks 32 formed with the other base transceiver stations 31-1 to 31-n forming radio zones different from the radio zone and receives combinations transmitted to the communication sublinks 32 by these other base transceiver stations 31-1 to 31-n to measure the quality of transmission.

Further, the station attribute discriminating means 34 discriminates whether or not it itself is the specific station based on one or both of the station information and the channel setting procedure.

The control means 16 interfaces between the communication link 15 formed with the base station control equipment 14 for leading the channel setting and the radio interface means 12. Further, the control means 16 sends to the communication link 15 the signal corresponding to the individual identification information obtained by the identification information acquisition means 13 and having the maximum value of the quality of transmission measured by the radio interface means 12 and the other station linkage means 33 among the signal received by the radio interface means 12 and signals contained in the combinations received by the other station linkage means 33 only when the result of the discrimination carried out by the station attribute discriminating means 34 is "true".

Namely, the base transceiver station to which the present invention is applied performs the simple processing of the selection of the signal to be transmitted to the base station control equipment 14 and the transmission of the signal via the communication link 15 only when it itself is the specific station and the transmission of the combination of the signal received at that station and the identification information obtained by the identification information acquisition means 13 as mentioned above to the communication sublink 32 when, conversely, it itself is not the specific station.

Accordingly, the load required for the selection and transmission of the signal to be transmitted to the base station control equipment 14 via the communication link 15 is shared by the specific station set based on one or both of the station information and the channel setting procedure and, in the same way as the first and second aspects of the present invention, the traffic of the communication link 15 or the hour ratio required for forming a path on the communication link 15 is reduced.

Further, since the base station control equipment 14 has sent to it the signal having the maximum quality of transmission among the signals arriving at a plurality of base transceiver stations in parallel via the communication link 15, the traffic over the communication link 15 or the hour ratio required for forming a path on this communication link 15 is reduced in comparison with a case where, in place of such a signal, a single or a plurality of signals having the quality of transmission exceeding a threshold value are transmitted.

In the base transceiver station equipment according to the fourth aspect of the present invention, the radio interface means 12 forms a radio zone, receives a signal transmitted by a mobile station 11 located in that radio zone according to the channel setting procedure or transmitted in the speech state, and measures the quality of transmission of the signal. The identification information acquisition means 13 acquires identification information added to the signal received by the radio interface means 12 from the mobile station 11 or identification information indicating the timing of reception of that signal.

The other station linkage means 33 sends a combination of the signal received by the radio interface means 12 and the identification information obtained by the identification information acquisition means 13 to the communication sublinks 32 formed with the other base transceiver stations 31-1 to 31-n forming radio zones different from the radio zone, receives combinations transmitted to the communication sublinks 32 by the other base transceiver stations 31-1 to 31-n, and measures the quality of transmission.

Further, the station attribute discriminating means 34 discriminates whether or not it itself is a specific station based on one or both of the station information and the channel setting procedure.

The control means 16 interfaces between the communication link 15 formed with the base station control equipment 14 for leading the channel setting and the radio interface means 12. Further, the control means 16 sends to the communication link 15 the signal which corresponds to the individual identification information obtained by the identification information acquisition means 13 and having a value of the quality of transmission measured by the radio interface means 12 and the other station linkage means 33 exceeding a threshold value among the signal received by the radio interface means 12 and signals contained in the combinations received by the other station linkage means 33 only when the result of the discrimination carried out by the station attribute discriminating means 34 is "true".

Namely, the base transceiver station to which the present invention is applied performs the simple processing of the selection of the signal to be transmitted to the base station control equipment 14 and the transmission of the signal via the communication link 15 only when it itself is the specific station and the transmission to the communication sublink 32 of the combination of the signal received at that station and the identification information obtained by the identification information acquisition means 13 as mentioned above when, conversely, it itself is not the specific station.

Accordingly, the load required for the selection and transmission of the signal to be transmitted to the base station control equipment 14 via the communication link 15 is shared by the specific station set based on one or both of the station information and the channel setting procedure and, in the same way as the first and second aspects of the present invention, the traffic of the communication link 15 or the hour ratio required for forming a path on the communication link 15 is reduced.

In the base transceiver station equipment according to the fifth aspect of the present invention, there is provided base transceiver station equipment according to the third and fourth aspects wherein the radio interface means 12 measures the quality of transmission only when the result of the discrimination carried out by the station attribute discriminating means 34 is "true" for signals arriving at that station from a mobile station Namely, when the station itself does not correspond to the specific station, the measurement of the quality of transmission carried out by the specific station is not uselessly carried out overlappingly, therefore reduction of the required amount of processing becomes possible.

In the base transceiver station equipment according to the sixth aspect of the present invention, there is provided base transceiver station equipment according to the third to fifth aspects wherein the other station linkage means 33 measures the quality of transmission only when the result of the discrimination carried out by the station attribute discriminating means 34 is "true" for signals arriving at the other base transceiver stations 31-1 to 31-n in parallel and then given via the communication sublink 15.

Namely, when the station itself does not correspond to the specific station, the measurement of the quality of transmission carried out by the specific station is not uselessly carried out overlappingly, therefore reduction of the required amount of processing becomes possible.

In the base transceiver station equipment according to the seventh aspect of the present invention, there is provided base transceiver station equipment according to the fourth to sixth aspects wherein the other station linkage means 33 sends a combination of the signal received by the radio interface means 12 and the quality of transmission measured for that signal to the communication sublinks 32 only when the result of the discrimination carried out by the station attribute discriminating means 34 is "false".

Namely, when the station itself corresponds to the specific station, the other base transceiver stations not corresponding to the specific station do not perform processing for transmitting a signal not processed in any way and the quality of transmission to the base transceiver station, therefore reduction of the required processing becomes possible.

In the base transceiver station equipment according to the eighth aspect of the present invention, there is provided base transceiver station equipment according to the first and fourth aspects wherein a value theoretically calculated in advance based on the zone configuration or found by actual measurement is applied to the control means 16 as the threshold value.

Namely, the signals to be transmitted to the base station control equipment 14 via the communication link 15 are limited to signals received with a quality of transmission adapted to the system configuration or the service to be provided to the mobile station 11, therefore flexible adaptation with respect to requests for operation and maintenance becomes possible.

In the base transceiver station equipment according to the ninth aspect of the present invention, there is provided a base transceiver station equipment according to the second to eighth aspects wherein the other station linkage means 23 and 33 discriminate whether or not there is any signal or quality of transmission to be transmitted to the communication sublinks 22 and 32 and form communication sublinks 22 and 32 via the dialup channels during the period during which the result of the discrimination is "true".

Namely, since a communication sublink 22 is formed cheaper in comparison with a case where a dedicated line is applied, reduction of the running cost becomes possible.

In the radio subsystem according to the 10th aspect of the present invention, the base station control equipment 42 performs the channel setting for the mobile stations located in radio zones individually formed by the base transceiver station equipment 41-1 to 41-N via a plurality N of communication links 15-1 to 15-N individually formed with the plurality N of base transceiver station equipment 41-1 to 41-N according to the first to fourth aspects. The base station control equipment 42 measures the length of the period during which the corresponding identification information overlap for one or both of the signals to be given via these communication links 15-1 to 15-N and the qualities of transmission of the signals and updates the threshold value to a larger value when this length exceeds the predetermined upper limit.

Further, the control means 16 provided in the base transceiver station equipment 41-1 to 41-N adopt the threshold value updated by the base station control equipment 42 with priority.

Namely, when the period during which signals are given to the base station control equipment 42 via the communication links 15-1 to 15-N overlappingly is long, the value of the threshold value is corrected to the large value, therefore the communication path is maintained while being flexibly adapted to the fluctuation of the radio transmission path and the other transmission characteristics.

In the radio subsystem according to the 11th aspect of the present invention, the base station control equipment 42 performs the channel setting for the mobile stations located in radio zones individually formed by the base transceiver station equipment 41-1 to 41-N via the plurality N of communication links 15-1 to 15-N individually formed with the plurality N of base transceiver station equipment 41-1 to 41-N according to the first to fourth aspects. The base station control equipment 42 measures the length of the period during which no corresponding identification information is given for one or both of the signals to be given via these communication links 15-1 to 15-N and the qualities of transmission of the signals and updates the threshold value to a smaller value when this length exceeds the predetermined upper limit.

Further, the control means 16 provided in the base transceiver station equipment 41-1 to 41-N adopt the threshold value updated by the base station control equipment 42 with priority.

Namely, when the period during which signals are not given to the base station control equipment 42 via the communication links 15-1 to 15-N is long, the value of the threshold value is corrected to the small value, therefore the communication path is maintained while being flexibly adapted to the fluctuation of the radio transmission path and the other transmission characteristics.

In the radio subsystem according to the 12th aspect of the present invention, the base station control equipment 52 performs the channel setting regarding mobile stations located in radio zones individually formed by the base transceiver station equipment 51-1 to 51-N via the plurality N of communication links 15-1 to 15-N individually formed with the plurality N of base transceiver station equipment 51-1 to 51-N according to the first to eighth aspects. The base station control equipment 52 updates the threshold value based on one or both of the station information and the channel setting procedure, and the control means 16 provided in the base transceiver station equipment 51-1 to 51-N adopt the threshold value updated in this way with priority.

Namely, since the signals to be transmitted to the base station control equipment 52 via the communication links 15-1 to 15-N are limited to signals received with a quality of transmission adapted to the system configuration or the service to be provided to the mobile station 11, flexible adaptation with respect to a request regarding operation and maintenance becomes possible.

In the radio subsystem according to the 13th aspect of the present invention, there is provided a radio subsystem according to the 10th to 12th aspects wherein the other station linkage means 23 and 33 provided in the plurality of base transceiver station equipment 41-1 to 41-N and 51-1 to 51-N specify the other base transceiver station equipment which becomes the destination of the signal or quality of transmission transmitted via the communication sublink 22 based on the station information or the channel setting procedure and form paths on communication sublink 22 limited to with these other base transceiver station equipment.

Namely, since a communication sublink 22 is formed cheaper than that of the case where a dedicated line is applied and the communication sublink 22 is shared by allocation to sequentially generated calls, reduction of the running cost becomes possible.

Below, a detailed explanation will be given of embodiments of the present invention based on the drawings.

Figure 5A:
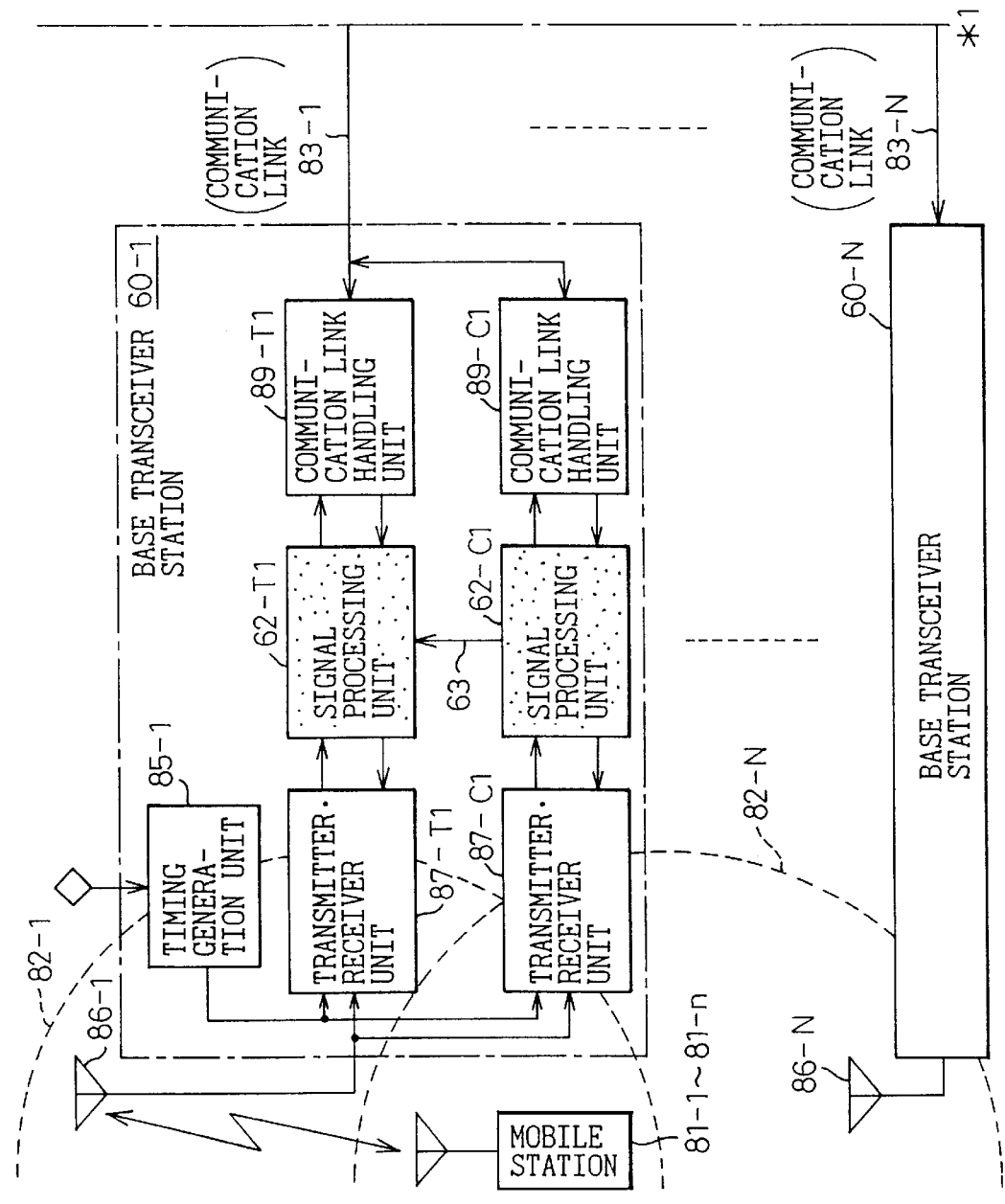

FIGS. 5A and 5B are views of embodiments corresponding to the first and 10th to 12th aspects of the present invention.

In the figures, components having the same function and structure as those shown in FIGS. 14A and 14B are given the same references and explanations thereof are omitted.

The difference in configuration between the present embodiments and the related art shown in FIGS. 14A and 14B resides in that the base transceiver stations 60-1 to 60-N are provided in place of the base transceiver stations 80-1 to 80-N and that a base station control office 61 is provided in place of the base station control office 84.

Further, the difference in configuration between the base transceiver station 60-1 and the base transceiver station 80-1 resides in that signal processing units 62-T1 and 62-C1 are provided in place of the signal processing units 88-T1 and 88-C1 and that these signal processing units 62-T1 and 62-C1 are directly connected via a link 63 enabling a handshake between the two.

Note that the configuration of the base transceiver stations 60-2 to 60-N is the same as the configuration of the base transceiver station 60-1, therefore, below, the corresponding components are indicated by the same references with the suffixes "2" to "N" and explanations thereof are omitted.

Further, the difference in configuration between the base station control office 61 and the base station control office 84 resides in that a signal processing unit 64-C is provided in place of the signal processing unit 92-C and a register 65 connected to the particular input of the signal processing unit 64-C is added.

Note that, looking at the correspondence between the present embodiments and the block diagrams shown in FIG. 1 and FIGS. 4A and 4B, the mobile stations 81-1 to 81-n correspond to the mobile station 11, the antennas 86-1 to 86-N and the transmitter-receiver units 87-T1 to 87-TN and 87-C1 to 87-CN correspond to the radio interface means 12, the signal processing units 62-T1 to 62-TN and 62-C1 to 62-CN correspond to the identification information acquisition means 13 and the control means 16, the communication links 83-1 to 83-N correspond to the communication link 15 (15-1 to 15-N), the base transceiver stations 60-1 to 60-N correspond to the base transceiver station equipment 41-1 to 41-N and 51-1 to 51-N, and the base station control office 61 corresponds to the base station control equipment 14, 42, and 52.

FIG. 6 is a flow chart of the operation of the embodiments corresponding to the first and 10th to 12th aspects of the present invention.

Figure 7:
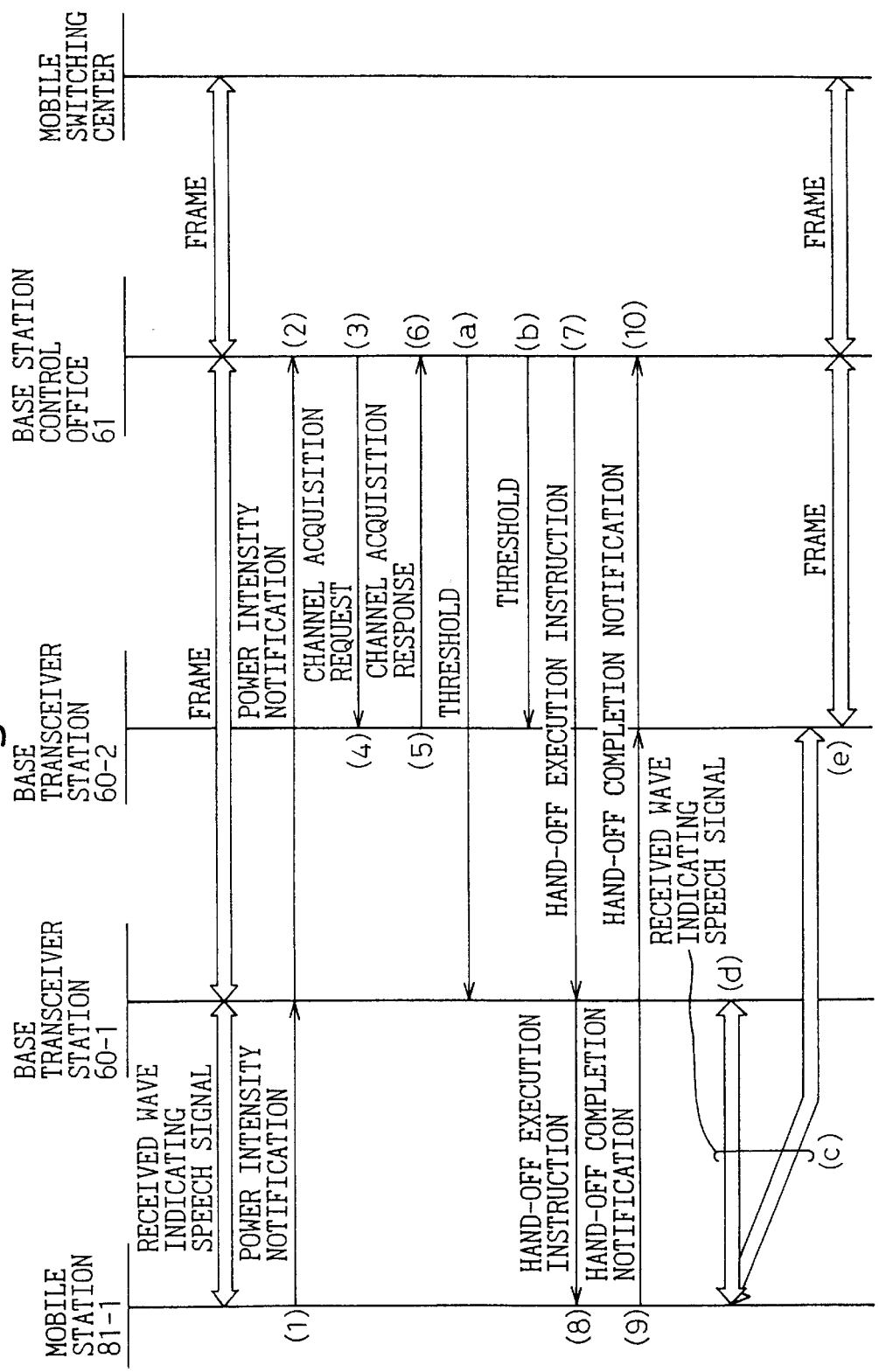
FIG. 7 is a view explaining the operation of an embodiment corresponding to the first aspect of the present invention.

FIG. 7 is a view for explaining the operation in the embodiment corresponding to the first aspect of the present invention.

In the figures, the same processing as the processing shown in FIG. 16 is indicated by the same numerals, and the explanations thereof are omitted.

Below, the operation of the embodiments corresponding to the first and 10th to 12th aspects of the present invention will be explained by referring to FIGS. 5A and 5B to FIG. 7.

First, below attention will be paid to the process of channel setting carried out for the hand-off of the mobile station 81-1 from the radio zone 82-1 to the radio zone 82-2 and maintaining the speech state after a successful call is generated in the mobile station 81-1 located at a position where the radio zones 82-1 and 82-2 overlap in the same way as the example of the related art.

Note that the operation of the components other than the signal processing units 62-T1, 62-C1 to 62-TN, 62-CN among components constituting the base transceiver stations 60-1 to 60-N and the components other than the signal processing units 92-T and 64-C and the register 65 among components constituting the base station control office 61 is the same as the operation in the related art, so the explanation thereof will be omitted below so far as there is nothing of particular note.

In the base station control office 61, the threshold value is set in advance in the register 65 as the lower limit of the quality of transmission capable of providing speech service at the intended quality.

When the "channel acquisition response" is given from the base transceiver station 60-2 forming the radio zone 82-2 to be handed off to in the same way as the example of the related art (FIG. 7(6)), the signal processing unit 92-T gives notification indicating this to the signal processing unit 64-C.

Further, when recognizing the notification, the signal processing unit 64-C acquires the threshold value held in the register 65 and transmits the threshold value to the base transceiver stations 60-2 and 60-1 forming the radio zone 82-2 and the origination radio zone 82-1, respectively (FIGS. 7(a), 7(b)).

In the base transceiver stations 60-1 and 60-2, when recognizing such a threshold value, the signal processing units 62-C1 and 62-C2 give the threshold value to the signal processing units 62-T1 and 62-T2.

Further, after the hand-off is normally completed (FIGS. 7(9) and 7(10)), in the state where the base transceiver stations 60-1 and 60-2 receive radio waves indicating speech signals from a mobile station 81-1 in parallel (FIG. 7(c)), the transmitter-receiver units 87-T1 and 87-T2 demodulate these received waves to generate a baseband signal and find the number ST of the error symbols as a result of the signal discrimination carried out in that process (FIG. 6(1)).

When recognizing that the transmission information indicates a speech signal by analyzing the transmission information indicated by such a baseband signal, the signal processing units 62-T1 and 62-T2 compare the number ST of error symbols found as mentioned above and the threshold value given in advance by the signal processing units 62-C1 and 62-C2 for this transmission information (FIG. 6(2)).

Further, the signal processing units 62-T1 (62-T2) discard the corresponding transmission information and number of error symbols when the number ST of error symbols exceeds the threshold value (FIG. 6(3) and FIG. 7(d)).

However, when the number ST of error symbols is lower than the threshold value, the signal processing unit 62-T1

(62-T2) converts the corresponding transmission information and number ST of error symbols to the frame shown in FIG. 15 in the same way as the related art (FIG. 6(4)) and transmits the frame to the base station control office 61 (FIG. 6(5) and FIG. 7(e)).

Namely, the frames transmitted from the base transceiver stations 60-1 to 60-N via communication links 83-1 to 83-N to the base station control office 61 are limited to frames obtained with a quality of transmission high enough that the number ST of error symbols is lower than the threshold value.

Accordingly, according to the present embodiment, even in a case where there are several mobile stations located at a position where a plurality of radio zones overlap, in comparison with the related art in which frames generated in accordance with radio waves arriving from these mobile stations in parallel were transmitted to the communication links 83-1 to 83-N without any thinning out, a great reduction of the maximum transmission capacity required for these communication links 83-1 to 83-N becomes possible.

Further, in the base station control office 61, the amount of processing required by the signal processing unit 92-T for selecting the frame to be transmitted to the mobile switching center is reliably reduced since the number of frames which become candidates for the selection of the frame is reduced.

Further, in the present embodiment, the load dispersion and the function dispersion of the channel setting required for the achievement of the maintenance of the speech state and hand-off are suitably promoted by the signal processing units (62-T1, 62-C1) to (62-TN, 62-CN) and the signal processing unit 64-C mounted in these base transceiver stations 60-1 to 60-N and base station control office 61 without a great change in the configuration of the base transceiver stations 60-1 to 60-N and the base station control office 61, therefore the quality of service is raised without a great increase of the cost.

Figure 8A:
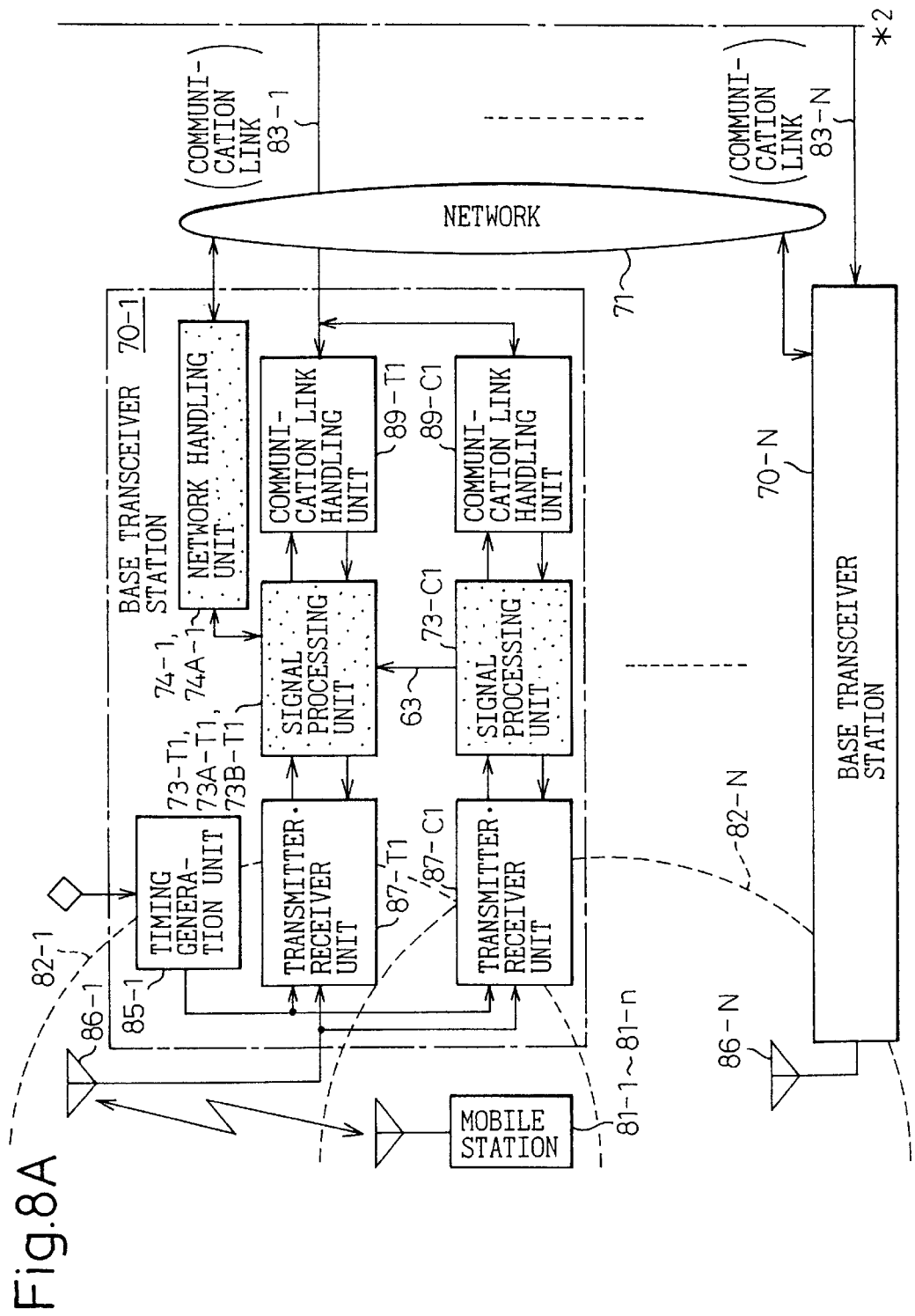
FIGS. 8A and 8B are views of embodiments corresponding to second to ninth and 13th aspects of the present invention.
Figure 8B:
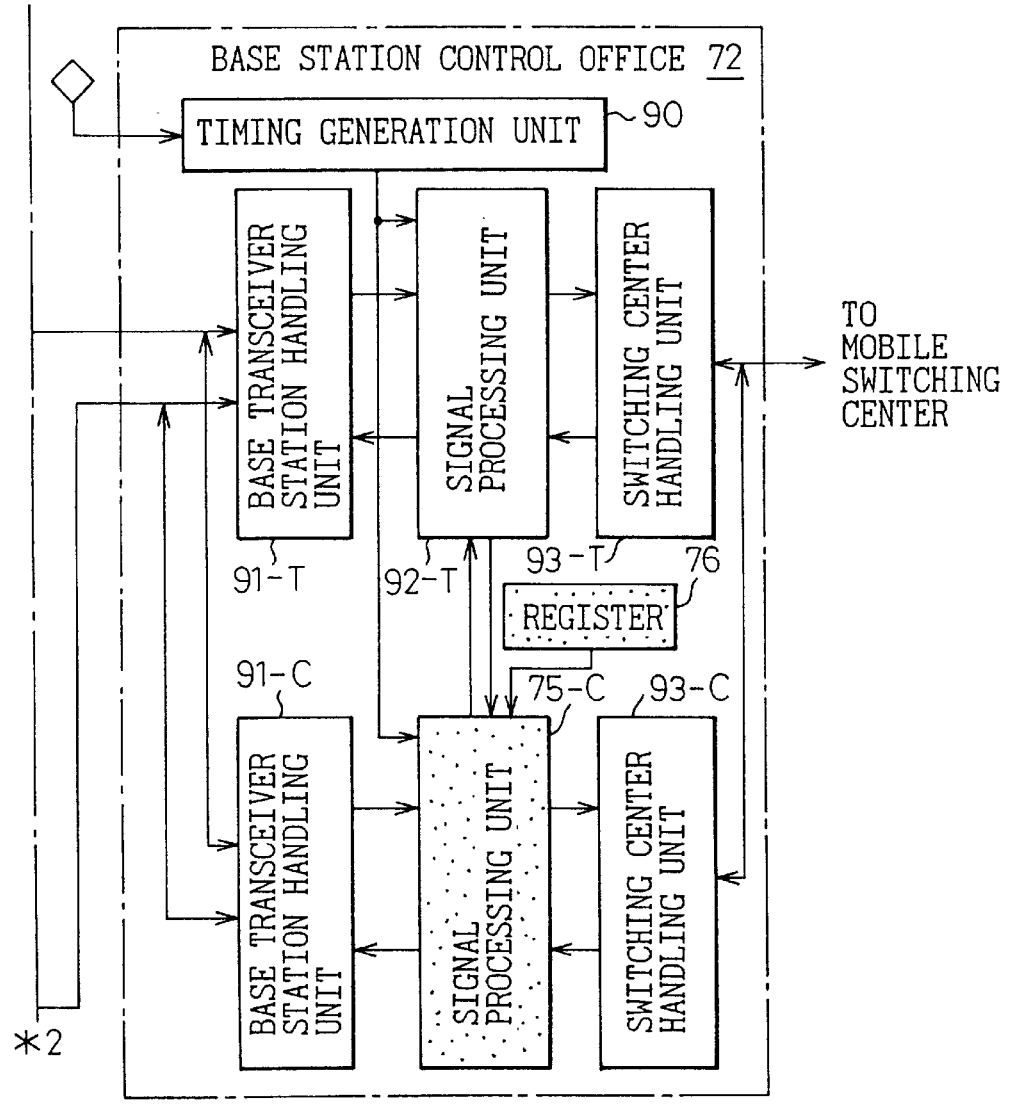

FIGS. 8A and 8B are views of embodiments corresponding to the second to ninth and 13th aspects of the present invention.

In the figures, components having the same function and configuration as those shown in FIGS. 5A and 5B are indicated by the same references and explanations thereof are omitted.

The difference in the configuration between the present embodiments and the embodiments shown in FIGS. 5A and 5B resides in that the base transceiver stations 70-1 to 70-N are provided in place of the base transceiver stations 60-1 to 60-N, these base transceiver stations 70-1 to 70-N are connected to each other via a network 71 formed mesh-like, and a base station control office 72 is provided in place of the base station control office 61.

The difference in configuration between the base transceiver station 70-1 and the base transceiver station 60-1 resides in that the signal processing units 73-T1 and 73-C1 are provided in place of the signal processing units 62-T1 and 62-C1 and in that the signal processing unit 73-T1 is connected to the network 71 via the network handling unit 74-1.

Note that the configuration of the base transceiver stations 70-2 to 70-N is the same as the configuration of the base transceiver station 70-1, therefore, below, the corresponding components are indicated by the same references with the suffixes "2" to "N" and explanations thereof are omitted.

Further, the difference in the configuration between the base station control office 72 and the base station control office 61 resides in that a signal processing unit 75-C is provided in place of the signal processing unit 64-C and in that a register 76 is provided in place of the register 65.

Note that the correspondence between the present embodiment and the block diagrams of FIG. 2 to FIG. 4 is the same as the correspondence in the embodiment corresponding to the first aspect of the present invention except all of the base transceiver stations 70-1 to 70-N correspond to other base transceiver stations 21-1 to 21-n and 31-1 to 31-n, the network 71 corresponds to the communication sublinks 22 and 32, the signal processing units 73-T1 to 73-TN and 73-C1 to 73-CN and the network handling units 74-1 to 74-N correspond to the other station linkage means 23 and 33, and the signal processing units 73-T1 to 73-TN and 73-C1 to 73-CN correspond to the station attribute discriminating means 34.

Figure 9B:
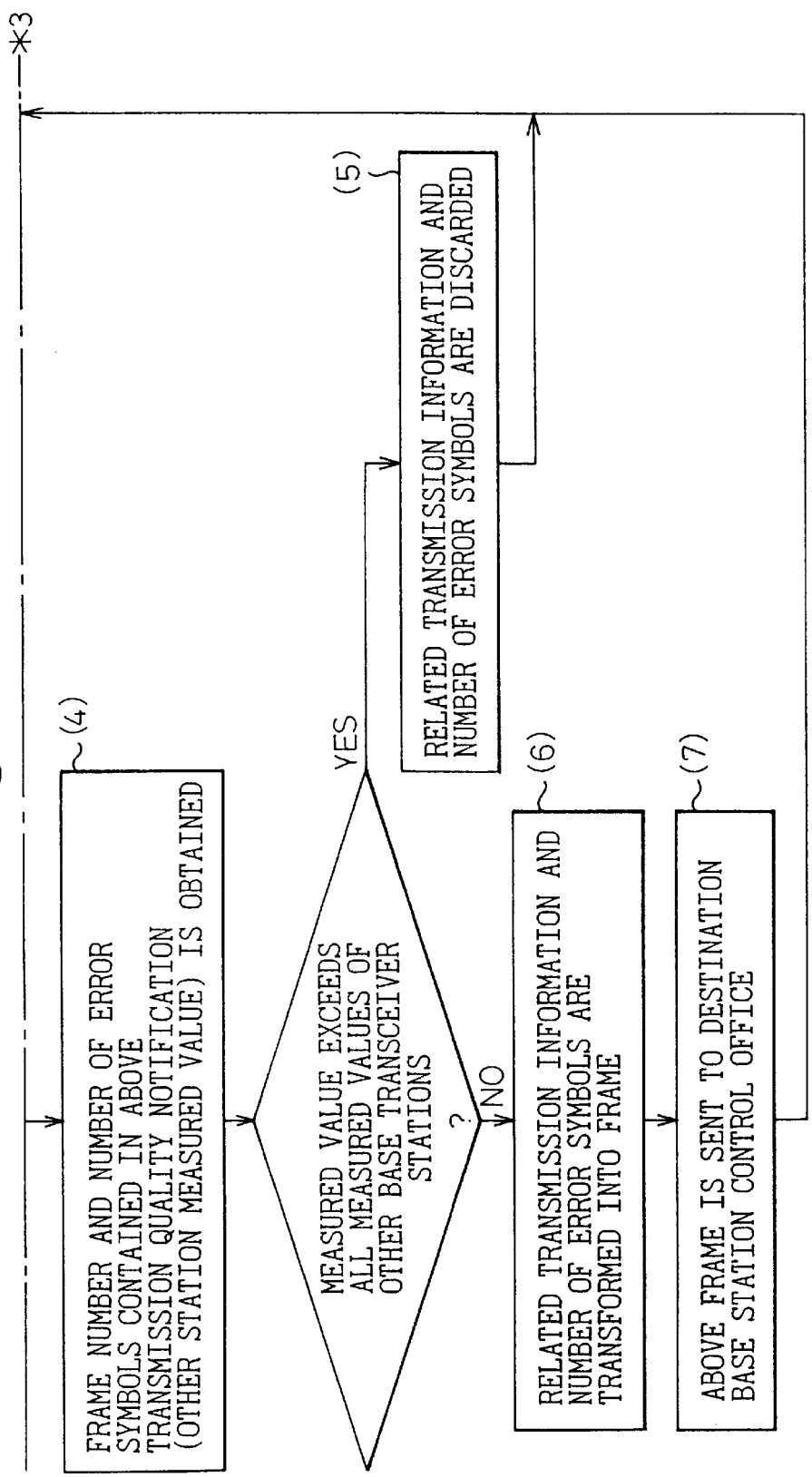

FIGS. 9A and 9B are flow charts of the operation of the embodiment corresponding to the second aspect of the present invention.

In the figures, the same processing as the processing shown in FIG. 6 are indicated by the same references and explanations thereof are omitted.

Further, FIG. 10 is a view for explaining the operation in the embodiment corresponding to the second aspect of the present invention.

In the figure, the same processing as the processing shown in FIG. 7 are also indicated by the same references and explanations thereof are omitted.

Below, the operation in the present embodiment corresponding to the second aspect of the present invention will be explained by referring to FIGS. 8A and 8B to FIG. 10.

First, attention will be paid to the process of the channel setting carried out for the hand off of the mobile station 81-1 from the radio zone 82-1 to the radio zone 82-2 and maintaining the speech state after a successful call is generated in the mobile station 81-1 located at a position where the radio zones 82-1 and 82-2 overlap in the same way as the related art.

Note that the operation of the components other than the signal processing units 73-T1, 73-C1 to 73-TN, 73-CN among components constituting the base transceiver stations 70-1 to 70-N and the components other than the signal processing units 92-T and 75-C and the register 76 among components constituting the base station control office 72 is the same as the operation in the example of the related art, so explanations thereof will be omitted below so far as there is nothing particularly to be noted.

In the base station control office 72, when a "channel acquisition response" is given from the base transceiver station 70-2 forming the radio zone 82-2 to be handed off to in the same way as the related art (FIG. 10(6)), the signal processing unit 92-T gives a notification indicating this to the signal processing unit 75-C.

When recognizing this notification, the signal processing unit 75-C (FIG. 8B) sends a "hand-off destination notification" including a "hand-off destination identification" indicating the radio zone 82-2 (or base transceiver station 70-2) of the hand-off destination to the base transceiver station 70-1 forming the radio zone 82-1 as the hand-off source (FIG. 10(a)), then sends a "hand-off source notification" including a "hand-off source identification" indicating the radio zone 82-1 (or base transceiver station 70-1) of the hand-off source to the base transceiver station 70-2 forming the radio zone 82-2 of the hand-off destination (FIG. 10(b)).

Further, when recognizing the "hand-off destination notification", the signal processing unit 73-C1 provided in the base transceiver station 70-1 gives hand-off destination identification information contained in that "hand-off destination notification" to the signal processing unit 73-T1 (FIG. 10(c)).

Further, when recognizing the "hand-off source notification", the signal processing unit 73-C2 provided in the base transceiver station 70-2 gives hand-off source identification information contained in the "hand-off source notification" to the signal processing unit 73-T2 (FIG. 10(d)).

After the hand-off is normally completed (FIGS. 10(9) and 10(10)), in the state where the base transceiver stations 70-1 and 70-2 receive radio waves indicating speech signals from the mobile station 81-1 in parallel (FIG. 10(e)), the transmitter-receiver units 87-T1 and 87-T2 demodulate these received waves so as to generate a baseband signal and find the number ST of error symbols (hereinafter simply referred to as "measured value") as a result of the signal discrimination carried out in that process (FIG. 9A(1) and FIGS. 10(f) and 10(g)).

When recognizing that the transmission information indicates a speech signal by analyzing the transmission information indicated by such a baseband signal, the signal processing units 73-T1 and 73-T2 send a "quality of transmission notification" including the measured value found as mentioned above (number ST of error symbols) and the frame number for this transmission information to the corresponding base transceiver stations 70-2 and 70-1 via the network handling units 74-1 and 74-2 and the network 71 (FIG. 9A(2) and FIGS. 10(h) and 10(i)).

Further, the signal processing units 73-T1 and 73-T2 receive this "quality of transmission notification" via the network handling units 74-1 and 74-2 (FIG. 9A(3)) and then acquire the frame number and the number ST of error symbols contained in the corresponding "quality of transmission notification" (hereinafter simply referred to as an "other station measured value"). (FIG. 9B(4) and FIGS. 10(j) and 10(k)).

Further, the signal processing unit 73-T2 (73-T1) compares individual measured values and the other station measured value corresponding to the common frame number among such other station measured values and discards the corresponding transmission information and number of error symbols when the former exceeds the latter (FIG. 9B(5) and FIG. 10(m)).

However, when the measured value is conversely lower than the other station measured value, the signal processing unit (73-T1) 73-T2 converts the corresponding transmission information and number ST of error symbols to the frame shown in FIG. 15 in the same way as the related art (FIG. 9B(6)) and sends the frame to the base station control office 72 (FIG. 9B(7) and FIG. 10(n)).

Namely, the frames transmitted from the base transceiver stations 70-1 to 70-N via the communication links 83-1 to 83-N to the base station control office 72 are limited to frames having the best quality of transmission.

Accordingly, according to the present embodiment, in comparison with the embodiment corresponding to the first aspect of the present invention, the amount of the traffic to be transmitted via the communication links 83-1 to 83-N and the amount of processing requested from the signal processing unit 92-T provided in the base station control office 72 are reduced, and the load dispersion and the function dispersion of the channel setting required for maintenance of the speech state and the achievement of the hand-off are properly promoted and the quality of service is raised.

Note that, in the embodiments, the other station measured value is obtained for only the radio zone 82-2, and the other station measured value and the measured value are compared, but the present invention can also be applied to a case where a mobile station 81-1 is located at a position where three or more radio zones overlap by the transmission of a frame corresponding to the measured value having the minimum value among these measured value and other station measured values.

Further, in the present embodiment, the frame corresponding to the measured value is transmitted to the base station control office 72 only when the measured value is smaller than the other station measured value, but it is also possible to secure the intended quality of speech and quality of service by the transmission of this frame to the base station control office 72 only when this measured value is lower than the intended threshold value.

Below, an explanation will be made of embodiments corresponding to the third to ninth and 13th aspects of the present invention.

The difference in the configuration between the present embodiments and the embodiment corresponding to the second aspect of the present invention resides in that, as shown in FIGS. 8A and 8B, signal processing units 73A-T1 to 73A-TN are provided in the base transceiver stations 70-1 to 70-N in place of the signal processing units 73-T1 to 73-TN.

FIGS. 11A and 11B are flow charts of the operation of the embodiments corresponding to the third to ninth and 13th aspects of the present invention.

Figure 12:
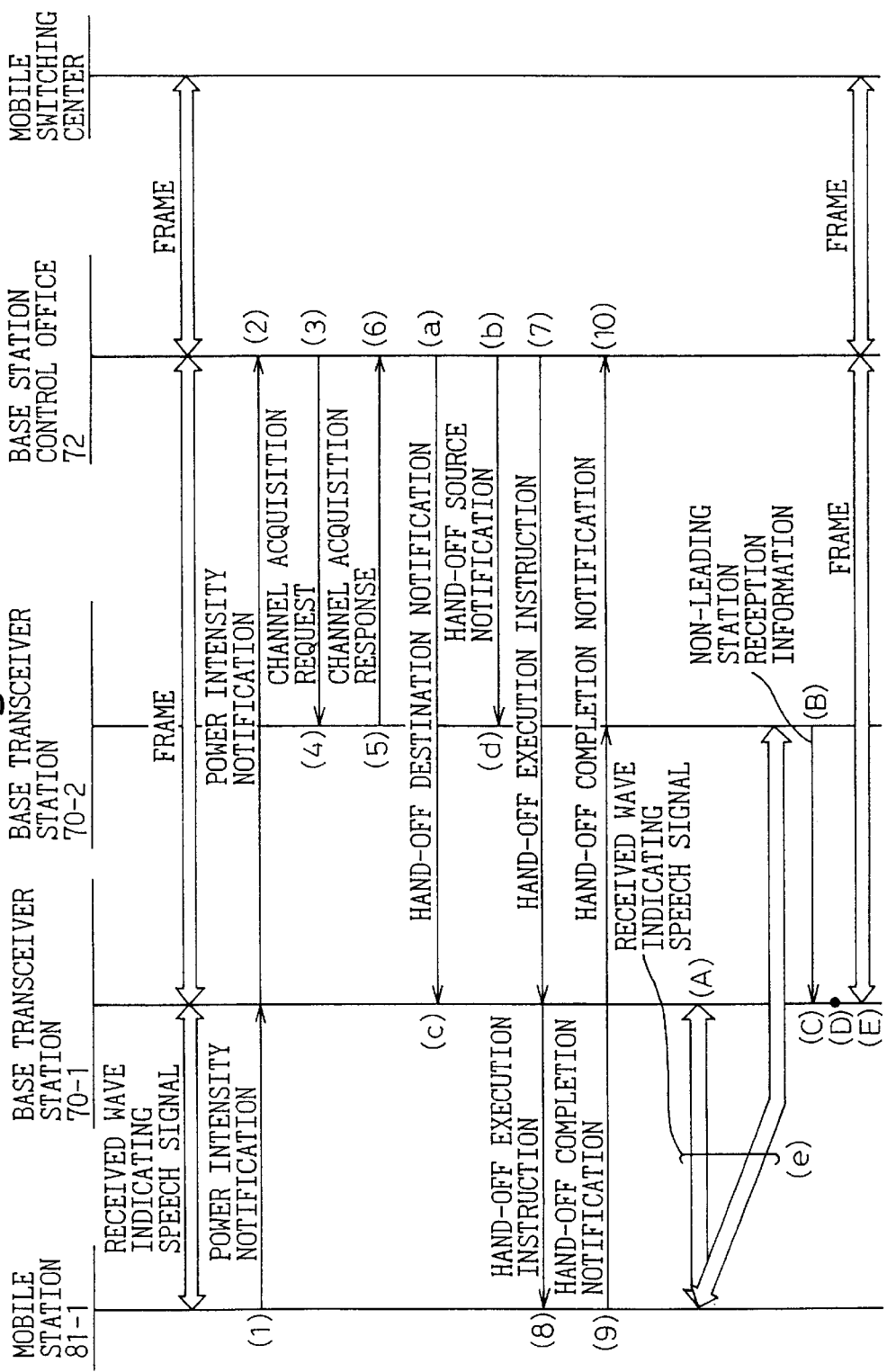
FIG. 12 is a view for explaining the operation in the embodiment corresponding to third to ninth and 13th aspects of the present invention.

FIG. 12 is a view for explaining the operation in the embodiments corresponding to the third to ninth and 13th aspects of the present invention.

In the figure, the same processing as the processing shown in FIG. 10 are indicated by the same references and explanations thereof are omitted.

Below, an explanation will be made of the operation in the embodiments corresponding to the third to eighth aspects of the present invention by referring to FIGS. 8A and 8B, FIGS. 11A and 11B, and FIG. 12.

The difference of the present embodiments from the embodiment corresponding to the second aspect of the present invention resides in the following operation after the hand-off is completed.

After the hand-off is normally completed (FIGS. 12(9) and 12(10)), in the state where the base transceiver stations 70-1 and 70-2 receive radio waves indicating speech signals from the mobile station 81-1 in parallel (FIG. 12(e)), the transmitter-receiver units 87-T1 and 87-T2 demodulate these received waves so as to generate the baseband signal and find the number ST of error symbols (hereinafter simply referred to as the "measured value") as a result of discrimination carried out in that process (FIG. 11A(1)).

The signal processing units 73A-T1 and 73A-T2 store and then analyze the transmission information indicated by such a baseband signal (FIG. 11A(2)) so as to discriminate whether or not the transmission information indicates a speech signal (hereinafter simply referred to as a "first discrimination") (FIG. 11A(3)).

Further, the signal processing units 73A-T1 and 73A-T2 discriminate whether or not the station itself is the "leading station" which leads the processing for the hand-off (hereinafter simply referred to as a "second discrimination") by referring to the station information (here, for simplicity, it is assumed that it is stored in advance in a specific storage region of the main memory) only when the result of the first discrimination is "true" (FIG. 11A(4)).

Note that, below, for simplicity, it is assumed that the base transceiver station 70-1 is the leading station and that the base transceiver station 70-2 is a "non-leading station" which is not such a leading station.

The signal processing unit 73A-T1 stores "leading station reception information" composed of the corresponding transmission information, the measured value found for that transmission information (number ST of error symbols), and the frame number since the result of the second discrimination becomes "true" (FIG. 12(A) and FIG. 11A(5)).

Further, the signal processing unit 73A-T2 sends "non-leading station reception information" composed of the corresponding transmission information, the measured value found for that transmission information (number ST of error symbols), and the frame number to the opposing base transceiver station (leading station) 70-1 via the network handling unit 74-2 and network 71 since the result of the second discrimination becomes "false" (FIG. 12(B) and FIG. 11(6)).

In the base transceiver station 70-1, the signal processing unit 73A-T1 receives this "non-leading station reception information" via the network handling unit 74-1, acquires the frame number and the number ST of error symbols (hereinafter simply referred to as the "other station measured value") which are contained in that "non-leading station reception information", and stores the same (FIG. 12(C) and FIG. 11B(7)).

Further, the signal processing unit 73A-T1 selects the smallest value (hereinafter simply referred to as a "minimum measured value") among all other station measured values corresponding to a frame number the same as the frame number contained in the previously stored leading station reception information and measured value contained in the leading station reception information (FIG. 11B(8)).

Further, the signal processing unit 73A-T1 discards all of the non-leading station reception information and leading station reception information (hereinafter referred to as "discarded reception information") composed of the measured values other than the minimum measured value among the other station measured values and measured values which became candidates of such a minimum measured value (FIG. 12(D) and FIG. 11B(9)) and converts the transmission information, number ST of error symbols, and frame number contained in the non-leading station reception information or leading station reception information including this minimum measured value (hereinafter referred to as a "specific reception information") to the frame shown in FIG. 15 (FIG. 11B(10)). Further, the signal processing unit 73A-T1 sends the frame to the base station control office 72 (FIG. 12(E) and FIG. 11B(11)).

Namely, the received waves arriving from a single mobile station to a plurality of base transceiver stations in parallel are collected at the leading station adapted to the configuration etc. of the system among these plurality of base transceiver stations, then only the transmission information and error symbol number ST given by the single received wave having the highest quality of transmission are transmitted to the base station control office 72 by this leading station.

Accordingly, according to the present embodiment, the load of the non-leading stations among the base transceiver stations 70-1 to 70-N is reduced, and the communication links 83-1 to 83-N can be combined so as to be adaptive to the zone configuration and the required transmission capacity can be reduced.

Further, the non-leading stations, which are installed in greater numbers than the leading stations, can be operated with simpler channel setting procedures to carry out, therefore reduction of the required amount of processing becomes possible.

Note that, in the present embodiment, the single leading station reception information or non-leading station reception information containing the minimum measured value is selected as the specific reception information, but the minimum measured value may also be limited to one lower than the threshold value (the intended quality of transmission is secured).

Further, while a single minimum measured value is selected in the present embodiment, when for example there are a plurality of leading station reception information and non-leading station reception information including the same minimum measured value, it is possible for all of the frames corresponding to the minimum measured values to be given to the base station control office 72.

Further, in the present embodiment, the single leading station reception information or non-leading station reception information including the minimum measured value is selected by discrimination of the relationship of magnitude of the numbers ST of error symbols contained in the leading station reception information and non-leading station reception information, but it is possible for example for all of the leading station reception information and non-leading station reception information including numbers ST of error symbols lower than a predetermined threshold value to be given as a frame to the base station control office 72 without such discrimination of the relationship of magnitude.

Further, in the present embodiment, the signal processing units 73A-T1 to 73A-TN provided in the base transceiver stations 70-1 to 70-N find the number ST of error symbols irrespective of whether or not the station itself is the leading station. However, when the number ST of error symbols is found (for example, in the transmission path decoding processing or other process) even in the opposing leading station via the network 71, it is possible not to perform the processing for finding the number of error symbols by the non-leading stations.

Further, when the aforementioned threshold value is applied to the present embodiment, it is possible even if the threshold values are individually set to values so that the load with respect to the base transceiver stations 70-1 to 70-N and base station control office 72 is properly dispersed while achieving the intended quality of service (including the quality of speech) by taking into account the distribution of the field strength individually measured for radio zones 82-1 to 82-N or theoretically found and the statistical distribution of mobile stations located in these radio zones 82-1 to 82-N.

Below, an explanation will be made of embodiments corresponding to the ninth and 13th aspects of the present invention.

The difference in the configuration between the present embodiment and the embodiments corresponding to the second to eighth aspects of the present invention resides in that, as shown in FIGS. 8A and 8B, signal processing units 73B-T1 to 73B-TN are provided in place of the signal processing units 73A-T1 to 73A-TN and network handling units 74A-1 to 74A-N are provided in place of the network handling units 74-1 to 74-N in the base transceiver stations 70-1 to 70-N and in that the network 71 is connected to these network handling units 74A-1 to 74A-N via the dialup channels.

Below, an explanation will be made of the operation in the embodiments corresponding to the ninth and 13th aspects of the present invention by referring to FIGS. 8A and 8B and FIG. 12.

In the base transceiver stations 70-1 to 70-N, the signal processing units 73B-T1 to 73B-TN identify all of radio zones adjoining the radio zone formed by the station itself or at which part or all of the regions overlap (hereinafter simply referred to as "cooperating zones") among the radio zones formed by the base transceiver stations other than the station itself based on the zone configuration (here, for simplicity, it is assumed that it is given as the station information) and notify the cooperating zone identification information individually indicating these cooperating zones to the network handling units 74A-1 to 74A-N.

The network handling units 74A-1 to 74A-N hold the cooperating zone identification information notified in this way.

Further, the signal processing units (73-C1 and 73B-T1) to (73-CN and 73B-TN) appropriately discriminate the existence of the "mobile stations existing in the radio zones 82-1 to 82-N formed by the stations themselves and in which any call (containing not only the outgoing call and incoming call, but also the call regarding the home location registration—not always a successful call) is generated (hereinafter, simply referred to as "zone engaging mobile stations")" based on the channel setting procedure carried out under the base station control office 72 when for example the station itself corresponds to the non-leading station. Further, the signal processing units 73B-T1 to 73B-TN give the result of discrimination to the network handling units 74A-1 to 74A-N.

The network handling units provided in the non-leading stations among the network handling units 74A-1 to 74A-N transmit the results of discrimination to the other base transceiver stations which are the base transceiver stations other than the station itself and form the radio zones indicated by the precedingly held cooperating zone identification information via the dialup channels, and then form communication links with these other base transceiver stations based on the predetermined call setting procedure when the result of such discrimination changes from "false" to "true".

However, when the result of the aforementioned discrimination changes from "true" to "false", the network handling units provided in the non-leading stations among the network handling units 74A-1 to 74-N smoothly release the corresponding communication links.

Further, the network handling unit provided in the leading station among the network handling units 74A-1 to 74A-N appropriately responds to incoming calls generated by transmission by network handling units provided in the non-leading stations via the dialup channels and maintains the communication links in accordance with line signals adapted to the dialup channels as mentioned above.

Namely, communication links are appropriately formed via the dialup channels among the base transceiver stations 70-1 to 70-N for only the period during which a call (including successful call) is generated in any mobile station located in the radio zones formed by these base transceiver stations 70-1 to 70-N.

Accordingly, according to these embodiments, in comparison with the case where such communication links are formed via dedicated lines, a reduction of the running costs becomes possible.

Note that, in the present embodiments, communication links are formed with the base transceiver stations forming cooperating zones by signal transmission by the network handling units provided in the non-leading stations via the dialup channels.

However, it is possible if the base transceiver stations provided with network handling units which must transmit signals in this way are properly determined in advance or appropriately updated based on the zone configuration, channel allocation, number of individually assigned radio channels, degree of congestion, distribution of traffic, and the like and further determined based on one or both of the call processing procedure carried out by the mobile switching center and the channel setting carried out by the base station control office 72.

Further, in the present embodiments, the cooperating zones are determined in advance, but when the position, in a radio zone, of a mobile station in which some sort of call is actually generated is identified in more detail (for example, grasped in units of sectors or specified via the mounted measuring means), it is also possible for cooperating zones which are actually formed overlappingly to be appropriately specified and for the communication links to be formed with these specified cooperating zones via the dialup channels for every call.

Further, it is also possible for the communication links formed in this way to be suitably shared for calls when there are a plurality of calls coexisting.

Below, an explanation will be made of embodiments corresponding to the 10th to 12th aspects of the present invention.

The difference in the configuration between the present embodiments and the embodiment corresponding to the first aspect of the present invention resides in that, as shown in FIGS. 5A and 5B, the signal processing unit 92A-T is provided in the base station control office 61 in place of the signal processing unit 92-T.

FIG. 13 is a view explaining the operation in the embodiments corresponding to the 10th to 12th aspects of the present invention.

In the figure, the same processing as the processing shown in FIG. 7 are indicated by the same references and explanations thereof are omitted.

Below, an explanation will be made of the operation in the embodiments corresponding to the 10th to 12th aspects of the present invention by referring to FIGS. 5A and 5B, FIG. 13, and FIGS. 14A and 14B.

The characteristic feature of the present embodiments resides in the procedure of the following processing carried out by the signal processing unit 92A-T provided in the base station control office 61 and the signal processing units 62-T to 62-TN provided in the base transceiver stations 60-1 to 60-N after the hand-off is normally completed. The linked operation of the units are basically the same as those of the embodiment corresponding to the first aspect of the present invention, therefore the explanation thereof is omitted.

After the hand-off is normally completed, in the state of the base transceiver stations 60-1 and 60-2 receiving radio waves indicating speech signals from the mobile station 81-1 in parallel ((c) in FIG. 13), the transmitter-receiver units 87-T1 and 87-T2 demodulate these received signals so as to generate the baseband signal and find the number ST of error symbols as the result of the signal discrimination carried out in that procedure ((A) and (B) in FIG. 13).

The signal processing units 62-T1 and 62-T2 compare the number ST of error symbols found as mentioned above and the threshold value previously given by the signal processing units 62-C1 and 62-C2 for this transmission information when it is recognized that the transmission information indicates a speech signal by analyzing the transmission information indicated by such a baseband signal.

Further, the signal processing unit 62-T1 (62-T2) discards the corresponding transmission information and number of error symbols when the number ST of error symbols exceeds the threshold value ((d) in FIG. 13), but conversely when it is lower than the threshold value, it converts the corresponding transmission information and the error symbol number ST to the frame shown in FIG. 15 and sends the frame to the base station control office 61 ((e) in FIG. 13).

On the other hand, in the base station control office 61, the signal processing unit 92A-T classifies individual frames for every frame by analyzing the transmission information contained in these frames and monitors both of the length of a first period (FIG. 13(C)) for which frames containing the same frame number are received and the length of a second period (FIG. 13(D)) for which any frame is received for individual calls.

Further, when the first period exceeds the first upper limit determined in advance, the signal processing unit 92A-T generates a "first update request" indicating this fact ((E) in FIG. 13), but when the second period exceeds the predetermined second upper limit, generates a "second update request" indicating this fact ((F) in FIG. 13).

Further, when generating such a first update request or second update request, the signal processing unit 92A-T sends these update requests to all or part of the base transceiver stations 60-1 to 60-N (for example, the base transceiver stations individually forming all radio zones containing the position of the mobile station generating the corresponding call, but here, for simplicity, it is assumed that the requests are sent to only the base transceiver stations 60-1 and 60-2) ((G) in FIG. 13).

On the other hand, in the base transceiver stations 60-1 and 60-2, when the first update request is given, the signal processing units 62-T1 and 62-T2 update the previously applied threshold value to a smaller value, while conversely when the second update request is given, they update the threshold value to a larger value.

Namely, the threshold value applied at the timing when the hand-off was normally completed or the previously applied threshold value is appropriately updated to a value suited to the transmission characteristic of the radio transmission path which can change in accordance with movement of the mobile station or a change of topology and ground objects and the like.

Accordingly, according to the present embodiments, the state where overlapping frames are uselessly given from a plurality of base transceiver stations to the base station control office 61 in parallel or a frame indicating a speech signal is not given from any of these plurality of base transceiver stations due to the fact that the value of the threshold value is not proper is eliminated with predetermined accuracy. Accordingly, the excess load of the base station control office 61 and reduction of the quality of service are eased.

Note that, in the present embodiments, the threshold value is updated in accordance with only the length of each of the first period and second period, but it is also possible for such a threshold value to be updated in any way in a direction resulting in, for example, a quick escape from the congested state, correction of the eccentricity of the quality of service with respect to a specific radio zone or mobile station, provision of service suited to service classes of individual mobile stations, and so on based on a channel setting procedure taking into account the distribution of the calls generated for every radio zone (for example, call origination and termination ratio, average reservation time, successful call ratio, and cause of occurrence of unsuccessful call) and the degree of the congestion as well as the station information indicating the zone configuration, channel allocation, and radio channels assigned for every base transceiver station and the like.

Further, in the present embodiments, the ba se transceiver stations 60-1 to 60-N corresponding to the first aspect of the present invention are applied to the 10th to 12th aspects of the present invention, but it is also possible if the base transceiver stations 70-1 to 70-N corresponding to the fourth aspect of the present invention are applied in place of these base transceiver stations 60-1 to 60-N.

Further, in the embodiments, the base transceiver stations 60-1 to 60-N and 70-1 to 70-N and the base station control offices 61 and 71 are connected via the communication links 83-1 to 83-N and arranged at different sites, but when for example the area where the radio zones 82-1 to 82-N are to be formed is narrow or the present invention is applied to the mobile communication system of the large zone type, it is possible even if just one base transceiver station is provided or the base transceiver stations are constituted integrally with the base station control office 61 or 71 or disposed at the same site (office).

Further, in the embodiments, the communication links 83-1 to 83-N are formed between the base transceiver stations 60-1 to 60-N, 70-1 to 70-N and the base station control offices 61 and 72, but it is possible if the transmission paths laid as these communication links 83-1 to 83-N are constituted as any of the bus-like, ring-like, or lattice-like transmission paths (wired transmission line, optical transmission line, wireless transmission line, or combination of the same).

Further, it is possible if any of the transmission method, signaling method, and multiple access method are applied to such transmission paths.

Further, in the embodiments, the hand-off was achieved by predetermined processing by one or both of the base transceiver stations 60-1 to 60-N and 70-1 to 70-N and base station control offices 61 and 72.

However, the present invention is not limited to such a hand-off and can be similarly applied to the channel setting process carried out for the successful call of a generated call (including a home location registration call).

Further, in the embodiments, the radio zones which became the source and destination of the hand-off were any of the radio zones 82-1 to 82-N individually formed by the base transceiver stations 60-1 to 60-N and 70-1 to 70-N.

However, the present invention is not limited to a mobile communication system having such a zone configuration and can be similarly applied to for example a hand-off among a plurality of sectors formed by a single base transceiver station.

Further, in the embodiments, the hand-off was initiated by movement of the mobile stations 81-1 to 81-n, but it is also possible to initiate hand-off as a result of a fall in the quality of transmission (field strength) detected by the base station control offices 61 and 72 based on the channel setting procedure.

Further, in the embodiments, the frame numbers were contained in frames transferred between the base transceiver stations 60-1 to 60-N and 70-1 to 70-N and the base station control offices 61 and 72.

However, if such a frame includes words enabling identification of the mobile station originating or receiving a call or the call generated in such a mobile station, it is also possible not to include the frame number and possible to give these words not only by the base transceiver stations 60-1 to 60-N and 70-1 to 70-N and base station control offices 61 and 72, but also by the mobile stations 81-1 to 81-n.

Further, the embodiments of the first to 13th aspects of the present invention were applied to a mobile communication system using CDMA, but the present invention is not limited to such a CDMA based system and can be similarly applied to a mobile communication system using time division multiple access (TDMA) or frequency division multiple access (FDMA) if it is permitted that a plurality of redundant frames be transmitted from the base transceiver stations 60-1 to 60-N and 70-1 to 70-N to the base station control offices 61 and 72.

Further, in the embodiments, frames of the format shown in FIG. 15 were transmitted from the base transceiver stations 60-1 to 60-N and 70-1 to 70-N to the base station control offices 61 and 72, but it is also possible to improve the flexibility of the procedure of the work relating to expansion or repair by ensuring compatibility of such frames with the example of the related art.

Summarizing the effects of the invention, as mentioned above, in the first, third, and fourth aspects of the present invention, in comparison with the related art, the traffic of the communication links formed with the base station control equipment or the hour ratio of the formation of paths over the communication links is reduced.

Further, in the second aspect of the present invention, in comparison with the first aspect of the present invention, the traffic of the communication links formed with the base station control equipment or the hour ratio of the formation of the paths over the communication links is reduced.

Further, in the fifth to seventh aspects of the present invention, reduction of the amount of processing becomes possible for one or both of the base transceiver station and base station control office.

Further, in the eighth and 12th aspects of the present invention, flexible adaptation to requests regarding operation and maintenance becomes possible.

Further, in the ninth and 13th aspects of the present invention, reduction of the running cost becomes possible.

Further, in the 10th and 11th aspects of the present invention, flexible adaptation with respect to fluctuations of the radio transmission path and other transmission characteristics becomes possible.

Accordingly, in a mobile communication system to which these aspects of the invention are applied, effective utilization of resources is achieved and the quality of service and reliability are maintained high cheaply.

What is claimed is:

1. Base transceiver station equipment provided with:
   a radio interface means which receives a signal in a hand off mode from a mobile station transmitting the signal to the base transceiver station equipment and to at least one neighboring base transceiver station equipment, and measures a quality of the received signal; and
   a control means that interfaces with the radio interface means and a communication link connected with a base station control equipment; wherein
   the control means determines whether or not the received signal should be transmitted to the communication link connected with the base station control equipment in accordance with a quality measured by the radio interface means and a threshold value.

2. Base transceiver station equipment according to claim 1, wherein the control means adopts a value theoretically calculated in advance based on the zone configuration or found by actual measurement as the threshold value.

3. Base transceiver station equipment according to claim 1, further comprising an identification information acquisition means that acquires identification information added to the signal received by the radio interface means from the mobile station or identification information indicating a timing of the reception of that signal; wherein
   the control means further transmits to the communication link the identification information obtained by the identification information acquisition means for this signal.

* * * * *